(12) United States Patent
Tanaka et al.

(10) Patent No.: US 8,025,313 B2
(45) Date of Patent: Sep. 27, 2011

(54) SUSPENSION SUBFRAME STRUCTURE OF VEHICLE

(75) Inventors: Masaaki Tanaka, Hiroshima (JP); Katsuyuki Komiya, Hiroshima (JP); Shin Murata, Hiroshima (JP); Norihisa Adachi, Hiroshima (JP); Yukihito Itami, Hiroshima (JP); Hitoshi Nagai, Hiroshima (JP); Takeshi Nakano, Hiroshima (JP)

(73) Assignees: Mazda Motor Corporation (JP); Y-Tec Corporation (JP)

( * ) Notice: Subject to any disclaimer, the term of this patent is extended or adjusted under 35 U.S.C. 154(b) by 0 days.

(21) Appl. No.: 12/411,067

(22) Filed: Mar. 25, 2009

(65) Prior Publication Data
US 2009/0243272 A1 Oct. 1, 2009

(30) Foreign Application Priority Data

Mar. 26, 2008 (JP) ................................. 2008-081208
Mar. 26, 2008 (JP) ................................. 2008-081209

(51) Int. Cl.
*B62D 21/06* (2006.01)
*B62D 21/11* (2006.01)

(52) U.S. Cl. .......... 280/781; 280/124.109; 280/124.135; 280/794; 180/311

(58) Field of Classification Search .................. 180/311, 180/312; 280/124.109, 781, 785, 787, 788, 280/794, 124.134, 124.135
See application file for complete search history.

(56) References Cited

U.S. PATENT DOCUMENTS 4,811,812 A * 3/1989 Cassese ......................... 180/295
4,826,203 A 5/1989 Kijima et al.
4,966,384 A * 10/1990 Endo et al. ............. 280/124.109
5,556,133 A * 9/1996 Oku et al. ..................... 280/781
5,562,308 A * 10/1996 Kamei et al. .................. 280/788

(Continued)

FOREIGN PATENT DOCUMENTS

DE 3812431 A1 11/1988

(Continued)

OTHER PUBLICATIONS

European Search Report dated Jul. 17, 2009; Application No./Patent No. 09155602.7-2421.

*Primary Examiner* — Paul N Dickson
*Assistant Examiner* — Joseph Rocca
(74) *Attorney, Agent, or Firm* — Studebaker & Brackett PC; Donald R. Studebaker

(57) ABSTRACT

Disclosed is a suspension subframe structure of a vehicle, which is capable of improving the overall rigidity of a suspension subframe to effectively receive input loads from suspension arms, while reducing the overall weight of the suspension subframe. The suspension subframe structure for supporting a plurality of suspension arms 14, 16 of a multi-link suspension system comprises first and second lateral members 20, 22 each extending in a lateral direction of the vehicle body, a pair of longitudinal members each extending in a longitudinal direction of the vehicle body, and right and left inclined members 28 each having one end which is located on the side of a respective one of right and left ends of the first lateral member and provided with an upper-arm support portion and a lower-arm support portion, wherein each of the right and left inclined members extends obliquely relative to the lateral direction in top plan view to connect the upper-arm support portion and the lower-arm support portion with a laterally intermediate portion of the second lateral member.

21 Claims, 15 Drawing Sheets

U.S. PATENT DOCUMENTS

| | | | |
|---|---|---|---|
| 6,415,884 B1 * | 7/2002 | Hawener et al. | 180/291 |
| 6,511,096 B1 * | 1/2003 | Kunert et al. | 280/785 |
| 6,742,808 B1 * | 6/2004 | Kosak | 280/781 |
| 6,755,429 B1 | 6/2004 | Buchwitz et al. | |
| 2009/0243271 A1 * | 10/2009 | Tanaka et al. | 280/781 |

FOREIGN PATENT DOCUMENTS

| | | |
|---|---|---|
| EP | 0295661 A | 12/1988 |
| EP | 1304280 A | 4/2003 |
| JP | 2005-193893 A | 7/2005 |
| WO | 9600661 A | 1/1996 |

* cited by examiner

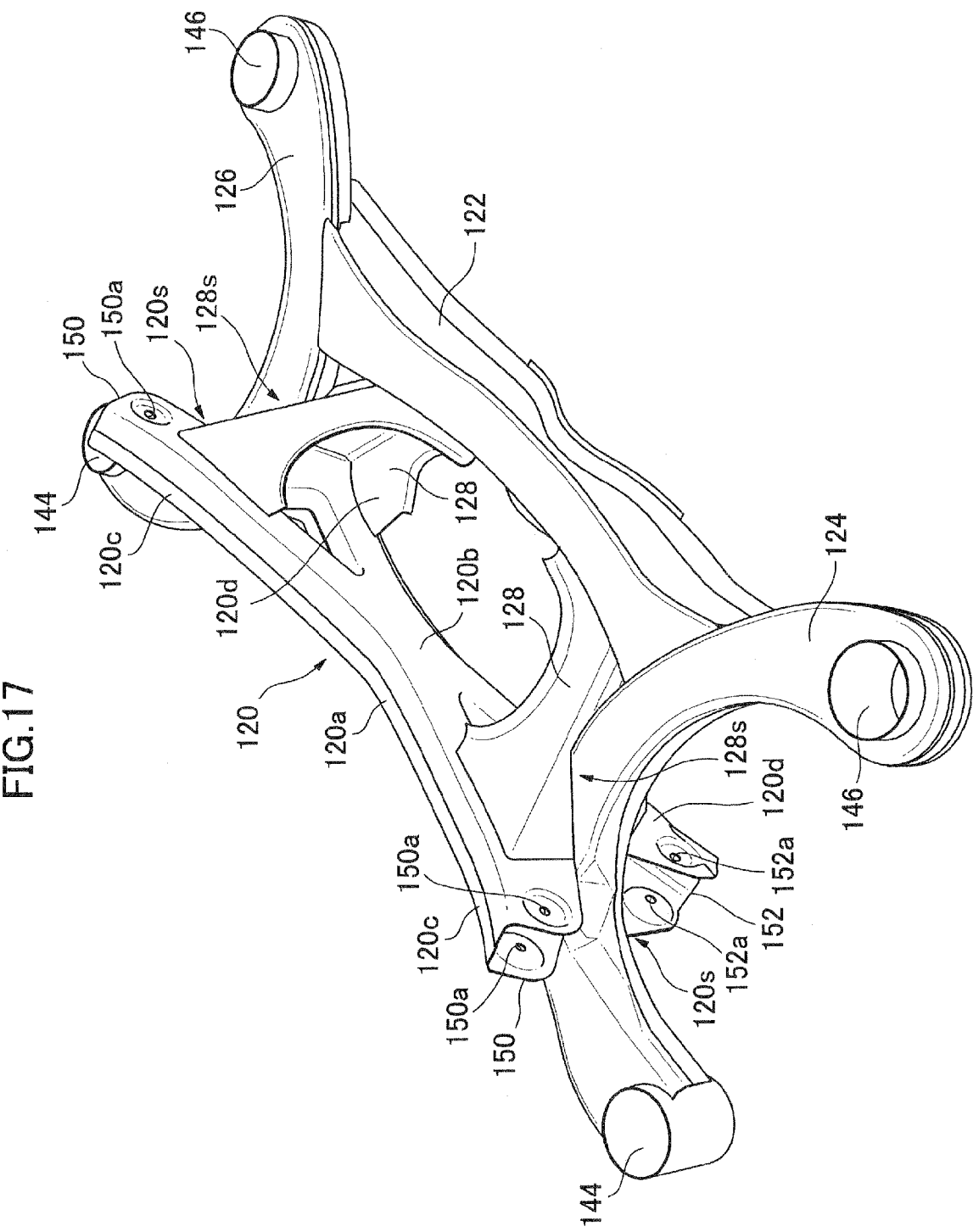

SUSPENSION SUBFRAME STRUCTURE OF VEHICLE

BACKGROUND OF THE INVENTION

1. Field of the Invention

The present invention relates to a suspension subframe structure of a vehicle, and more particularly to a suspension subframe structure of a vehicle for supporting a plurality of suspension arms of a pair of right and left multi-link suspension systems.

2. Description of the Related Art

Heretofore, a multi-link suspension system called "E-type multi-link suspension system" has been known. JP 2005-193893A (hereinafter referred to as "Patent Document 1") discloses a structure of a rear suspension subframe for supporting a plurality of suspension arms of a pair of right and left E-type multi-link rear suspension systems.

A conventional subframe, such as the subframe disclosed in the Patent Document 1, comprises a plurality of subframe members each having a rectangular-shaped hollow closed cross-section or an angular C-shaped cross-section, wherein the plurality of subframe members are assembled together in a double cross shape. In the conventional subframe, in order to handle or receive large input loads, such as tensile and compressive loads, from suspension arms, particularly, during turning of a vehicle, it is necessary to increase the overall rigidity thereof by enlarging a cross-sectional area of the subframe member itself or providing a reinforcing member, which leads to a problem about an increase in weight.

Moreover, depending on mounting positions of the suspension arms to the subframe member extending in a frontward-rearward (i.e., longitudinal) direction of the vehicle and the subframe member extending in a widthwise (i.e., lateral) direction of the vehicle, torsional or bending deformation occurs between the subframe members. This is disadvantageous in terms of rigidity and reliability, which leads to a further increase in weight.

SUMMARY OF THE INVENTION

In view of the above problems in the conventional subframe, it is an object of the present invention to provide a suspension subframe structure of a vehicle, capable of improving the overall rigidity of a suspension subframe to effectively receive input loads from suspension arms, while reducing the overall weight of the suspension subframe.

In order to achieve this object, according to one aspect of the present invention, there is provided a suspension subframe structure of a vehicle for supporting a plurality of suspension arms of a pair of right and left multi-link suspension systems. The suspension subframe structure comprises first and second lateral members provided in spaced-apart relation to each other in a longitudinal direction of a vehicle body and each extending in a lateral direction of the vehicle body, a pair of longitudinal members each extending in the longitudinal direction, in such a manner that one of the longitudinal members connects respective left ends of the first and second lateral members, and the other longitudinal member connects respective right ends of the first and second lateral members, a pair of right and left upper-arm support portions provided in respective ones of the right and left ends of the first lateral member, a pair of right and left lower-arm support portions provided in respective ones of the right and left ends of the first lateral member, and right and left inclined members each extending obliquely relative to the lateral direction in top plan view to connect a respective one of the right and left ends or end-adjacent portions of the first lateral member with a laterally intermediate portion of the second lateral member, wherein the right and left inclined members are adapted to transmit loads of the suspension systems from the upper-arm support portions and the lower-arm support portions, to the second lateral member therethrough.

In the suspension subframe structure of the present invention, each of the right and left inclined members connects the respective one of the right and left ends or end-adjacent portions of the first lateral member with the laterally intermediate portion of the second lateral member, to transmit loads of the suspension systems from the upper-arm support portions and the lower-arm support portions, to the second lateral member therethrough. Thus, when large input loads are applied to the upper-arm support portions and the lower-arm support portions in the lateral direction during turning of the vehicle, the loads applied to the upper-arm and lower-arm support portions are received by the right and left inclined members and then the received loads are transmitted to the second lateral member through the right and left inclined members. Further, each of the right and left inclined members is arranged to extend obliquely relative to the lateral direction in top plan view, so that each of two lateral sides of the suspension frame is formed as an approximately triangular-shaped portion by the right and left inclined member, the second lateral member and the longitudinal member. This makes it possible to improve the overall rigidity of the suspension subframe to effectively receive loads from the suspension arms, while reducing the overall weight of the suspension subframe.

Preferably, in the suspension subframe structure of the present invention, each of the right and left inclined members has one end joined to a respective one of the right and left ends of the first lateral member in such a manner as to form a corresponding one of a combination of the right upper-arm and lower-arm support portions and a combination of the left upper-arm and lower-arm support portions, in cooperation with the corresponding one of the right and left ends of the first lateral member.

According to this feature, loads applied to the upper-arm and lower-arm support portions can be effectively received by the first lateral member and the right and left inclined members.

Preferably, in the suspension subframe structure of the present invention, the first lateral member is comprised of at least two sub-members assembled together to form a combination of the right upper-arm and lower-arm support portions and a combination of the left upper-arm and lower-arm support portions, and each of the right and left inclined members is connected to a vicinity of a corresponding one of the combination of the right upper-arm and lower-arm support portions and the combination of the left upper-arm and lower-arm support portions.

According to this feature, loads applied to the upper-arm and lower-arm support portions can be effectively received by the first lateral member, and further received by the right and left inclined members connected to the respective vicinities of the right and left ends of the first lateral member.

Preferably, in the suspension subframe structure of the present invention, the first lateral member is adapted to receive loads diagonally between the left upper-arm support portion and the right lower-arm support portion and diagonally between the right upper-arm support portion and the left lower-arm support portion.

According to this feature, during turning of the vehicle, for example, during clockwise turning on an assumption that right and left road-wheels have the same phase at a tire/ground contact point, a load compressing the first lateral member is applied to the left lower-arm support portion and to the right upper-arm support portion diagonally aligned with the left lower-arm support portion, and a load tensioning the first lateral member is applied to the left upper-arm support portion and to the right lower-arm support portion diagonally aligned with the left upper-arm support portion. These lateral loads are diagonally applied to and received by the first lateral member, in the above manner. This makes it possible to allow the first lateral member to efficiently receive the loads from the right and left suspension arms and effectively cancel out the laterally oppositely directed loads.

Preferably, in the suspension subframe structure of the present invention, a part of respective ones of the upper-arm and lower-arm support portions is provided in respective ends of the right and left inclined members.

According to this feature, a part of respective ones of the upper-arm and lower-arm support portions is provided in respective ends of the right and left inclined members. Thus, when large input loads are applied to the upper-arm support portions and the lower-arm support portions in the lateral direction during turning of the vehicle, the loads applied to the upper-arm and lower-arm support portions are received by the right and left inclined members and then the received loads are transmitted to the second lateral member through the right and left inclined members. Further, each of the right and left inclined members is arranged to extend obliquely relative to the lateral direction in top plan view, so that each of two lateral sides of the suspension frame is formed as an approximately triangular-shaped portion by the right and left inclined member, the second lateral member and the longitudinal member. This makes it possible to improve the overall rigidity of the suspension subframe to effectively receive loads from the suspension arms, while reducing the overall weight of the suspension subframe.

Preferably, in the suspension subframe structure of the present invention, each of the right and left inclined members has one end formed to connect the upper-arm and lower-arm support portions in a respective one of the right and left ends of the first lateral member, in an upward-downward direction.

According to this feature, each of the right and left inclined members has one end formed to connect the upper-arm and lower-arm support portions in the respective one of the right and left ends of the first lateral member, in an upward-downward direction. This makes it possible to improve rigidity of the right and left inclined member and increase rigidity for supporting the suspension arms so as to increase the overall rigidity of the suspension subframe.

Preferably, in the suspension subframe structure of the present invention, a part of respective ones of the upper-arm and lower-arm support portions is integrally formed in the right and left inclined members.

According to this feature, a part of respective ones of the upper-arm and lower-arm support portions is integrally formed in the right and left inclined members. This makes it possible to efficiently transmit loads from the suspension arms to the right and left inclined members.

Preferably, in the suspension subframe structure of the present invention, the upper-arm and lower-arm support portions are integrally formed by the right and left ends of the first lateral member and ends of the right and left inclined members joined to respective ones of the right and left ends.

According to this feature, the upper-arm and lower-arm support portions are integrally formed by the right and left ends of the first lateral member and the ends of the right and left inclined members joined to respective ones of the right and left ends. This makes it possible to allow loads from the suspension arms to be effectively received by and efficiently transmitted to the right and left inclined members, the first lateral member and the second lateral member.

Preferably, in the suspension subframe structure of the present invention, each of the right and left inclined members is formed to have a height dimension which gradually decreases in a direction from the upper-arm and lower-arm support portions toward the laterally intermediate portion of the second lateral member.

According to this feature, each of the right and left inclined members is formed to have a height dimension which gradually decreases in a direction from the upper-arm and lower-arm support portions toward the laterally intermediate portion of the second lateral member. This makes it possible to remove a portion of the right and left inclined member unnecessary for transmitting loads applied to the upper-arm and lower-arm support portions to facilitate a reduction in weight of the right and left inclined members so as to further reduce the overall weight of the suspension subframe.

Preferably, in the suspension subframe structure of the present invention, each of the right and left inclined members is formed with at least one through-hole having a height dimension which gradually decreases in a direction from the upper-arm and lower-arm support portions corresponding to one end thereof, toward the laterally intermediate portion of the second lateral member.

According to this feature, each of the right and left inclined members is formed with at least one through-hole having a height dimension which gradually decreases in a direction from the upper-arm and lower-arm support portions corresponding to one end thereof, toward the laterally intermediate portion of the second lateral member. This makes it possible to remove a portion of the right and left inclined member unnecessary for transmitting loads applied to the upper-arm and lower-arm support portions to facilitate a reduction in weight of the right and left inclined member so as to further reduce the overall weight of the suspension subframe.

Preferably, in the suspension subframe structure of the present invention, the first lateral member is formed by joining a front sub-member and a rear sub-member together, and the upper-arm and lower-arm support portions are integrally formed by the front sub-member and the rear sub-member.

According to this feature, the suspension arms can be more reliably supported by the front and rear sub-members of the first lateral member. In addition, loads of the right and left multi-link suspension systems applied to the upper-arm and lower-arm support portions can be effectively received by the first lateral member.

Preferably, in the above suspension subframe structure where each of the right and left inclined members having one end formed to connect the upper-arm and lower-arm support portions in a respective one of the right and left ends of the first lateral member, in an upward-downward direction, each of the right and left inclined members comprises an upper sub-member and a lower sub-member which are connected together in the upward-downward direction through a corresponding one of the longitudinal members.

According to this feature, each of the right and left inclined members is divided into the upper and lower sub-members to ensure formability, and then the upper and lower sub-members are connected together in the upward-downward direction through the longitudinal member. This makes it possible to further improve the rigidity of the right and left inclined member and increase the rigidity for supporting the suspension arms, so as to increase the overall rigidity of the suspension subframe.

Preferably, in the suspension subframe structure of the present invention, the upper-arm and lower-arm support portions in each of the right and left ends of the first lateral member are located above and below a corresponding one of the longitudinal members in such a manner as to interpose the longitudinal member therebetween while keeping a given small distance from the longitudinal member.

According to this feature, the upper-arm and lower-arm support portions in each of the right and left ends of the first lateral member are located above and below a corresponding one of the longitudinal members in such a manner as to interpose the longitudinal member therebetween. This makes it possible to effectively utilize a space above and below the longitudinal member to reduce an overhang of each of the upper-arm and lower-arm support portions from the longitudinal member so as to increase rigidity of each of the upper-arm and lower-arm support portions.

In the suspension subframe structure of the present invention, when the suspension arms of the right and left multi-link suspension systems comprise a pair of right and left front upper arms, a pair of right and left front lower arms, and a pair of right and left rear lower arms, wherein each of the front upper arms and the front lower arms is disposed on a frontward side of the right and left multi-link suspension systems, and each of the rear lower arms is disposed on a rearward side of the right and left multi-link suspension systems, the second lateral member is preferably formed to allow each of the rear lower arms to be connected thereto in a same position as or in a vicinity of a position where the right and left inclined members are connected to the second lateral member.

According to this feature, when the suspension arms of the right and left multi-link suspension systems comprise the pair of right and left front upper arms, the pair of right and left front lower arms and the pair of right and left rear lower arms, each of the rear lower arms is supported by the second lateral member in the same position as or in the vicinity of the position where the right and left inclined members are connected to the second lateral member. This makes it possible to allow rigidity for supporting the rear lower arms to be increased by the right and left inclined members connected to the second lateral member.

In the suspension subframe structure of the present invention, when the suspension arms of the right and left multi-link suspension systems comprise a pair of right and left front upper arms and a pair of right and left front lower arms, each disposed on a frontward side of the right and left multi-link suspension systems, and the second lateral member is disposed rearward of the first lateral member, so that the first lateral member serves as a front lateral member and the second lateral member serves as a rear lateral member, it is preferable that each of the right and left inclined members has one end joined to a respective one of the right and left ends of the front lateral member, wherein the right and left upper-arm support portions are formed to support respective ones of the right and left front upper arms, and the right and left lower-arm support portions are formed to support respective ones of the right and left front lower arms.

According to this feature, each of the right and left inclined members has one end joined to a respective one of the right and left ends of the front lateral member, and the other end joined to a laterally intermediate portion of the rear lateral member. Further, the right and left upper-arm support portions support respective ones of the right and left front upper arms of the right and left multi-link suspension systems, and the right and left lower-arm support portions support respective ones of the right and left front lower arms of the right and left multi-link suspension systems. Thus, during turning of the vehicle, relatively large input loads of the front upper and lower arms can be effectively received by the front lateral member, the right and left inclined members and the rear lateral member.

In the suspension subframe structure of the present invention, when the suspension arms of the right and left multi-link suspension systems comprise a pair of right and left longitudinal arms each arranged to extend from a corresponding one of right and left road-wheel support members in a frontward direction of the vehicle body, and at least six lateral arms including a pair of right and left front upper arms and a pair of right and left front lower arms, each arranged to extend from a corresponding one of the right and left road-wheel support members in a laterally inward direction and disposed on a frontward side of the right and left multi-link suspension systems, it is preferable that the right and left upper-arm support portions are formed to support respective ones of the right and left front upper arms, and the right and left lower-arm support portions are formed to support respective ones of the right and left front lower arms.

According to this feature, when the suspension arms of the right and left multi-link suspension systems comprise the pair of right and left longitudinal arms each arranged to extend from a corresponding one of the right and left road-wheel support members in a frontward direction of the vehicle body, and at least six lateral arms including a pair of right and left front upper arms and a pair of right and left front lower arms, each arranged to extend from a corresponding one of the right and left road-wheel support members in a laterally inward direction and disposed on a frontward side of the right and left multi-link suspension systems, the right and left upper-arm support portions support the respective ones of the right and left front upper arms, and the right and left lower-arm support portions support the respective ones of the right and left front lower arms. Thus, during turning of the vehicle, relatively large input loads of the front upper and lower arms can be effectively received by the right and left inclined members.

Preferably, in the above suspension subframe structure where the upper-arm and lower-arm support portions are integrally formed by the right and left ends of the first lateral member and ends of the right and left inclined members joined to respective ones of the right and left ends, each of the upper-arm and lower-arm support portions is formed to have an angular C-shaped cross-section.

According to this feature, each of the upper-arm and lower-arm support portions integrally formed by the right and left ends of the first lateral member and ends of the right and left inclined members joined to respective ones of the right and left ends has an angular C-shaped cross-section. This makes it possible to increase rigidity of each of the upper-arm and lower-arm support portions, and allow a component, such as a suspension bush or a rotatable rod, to be installed inside the angular C-shaped cross-section portion so as to promote effective utilization of space.

Preferably, in the above suspension subframe structure where the upper-arm and lower-arm support portions are integrally formed by the right and left ends of the first lateral member and ends of the right and left inclined members joined to respective ones of the right and left ends, each of the upper-arm and lower-arm support portions is formed to have a closed cross-section.

According to this feature, each of the upper-arm and lower-arm support portions integrally formed by the right and left ends of the first lateral member and the ends of the right and left inclined members joined to respective ones of the right and left ends has a closed cross-section. This makes it possible to increase rigidity of each of the upper-arm and lower-arm support portions, and allow a component, such as a suspension bush or a rotatable rod, to be installed inside the closed cross-section portion so as to promote effective utilization of space.

Preferably, in the above suspension subframe structure where the upper-arm and lower-arm support portions are integrally formed by the right and left ends of the first lateral member and ends of the right and left inclined members joined to respective ones of the right and left ends, the first lateral member and each of the right and left inclined members are joined together in a position between the upper-arm and lower-arm support portions in a respective one of the right and left ends of the first lateral member, wherein the joined portion between the first lateral member and each of the right and left inclined members is joined to a corresponding one of the longitudinal members.

According to this feature, the first lateral member and each of the right and left inclined members are joined together in a position between the upper-arm and lower-arm support portions, and the joined portion is joined to a corresponding one of the longitudinal members. This makes it possible to increase rigidity of a joined portion between the longitudinal member and each of the first lateral member and the right and left inclined member, and improve respective rigidities of the first lateral member and the right and left inclined members so as to further increase the overall rigidity of the suspension subframe. For example, in this case, the joined portion between the first lateral member and each of the right and left inclined members may be formed to have a closed cross-section in such a manner as to allow the longitudinal member to be joined thereto, so as to further increase respective rigidities of the upper-arm and lower-arm support portions and the overall rigidity of the suspension subframe.

In order to achieve the above object, according to a second aspect of the present invention, there is provided a suspension subframe structure of a vehicle for supporting a plurality of suspension arms of a pair of right and left multi-link suspension systems. The suspension subframe structure comprises first and second lateral members provided in spaced-apart relation to each other in a longitudinal direction of a vehicle body and each extending in a lateral direction of the vehicle body, a pair of longitudinal members extending in the longitudinal direction in such a manner that one of the longitudinal members connects respective left ends of the first and second lateral members, and the other longitudinal member connects respective right ends of the first and second lateral members, and right and left inclined members each having one end which is located on the side of a respective one of the right and left ends of the first lateral member and provided with an upper-arm support portion and a lower-arm support portion, wherein each of the right and left inclined members extends obliquely relative to the lateral direction in top plan view to connect the upper-arm support portion and the lower-arm support portion with a laterally intermediate portion of the second lateral member.

In the suspension subframe structure of the present invention, each of the right and left inclined members connects the upper-arm and lower-arm support portions provided in the end thereof with the laterally intermediate portion of the second lateral member. Thus, when large input loads are applied to the upper-arm and lower-arm support portions in the lateral direction during turning of the vehicle, the loads applied to the upper-arm and lower-arm support portions are received by the right and left inclined members and then the received loads are transmitted to the second lateral member through the right and left inclined members. Further, each of the right and left inclined members is arranged to extend obliquely relative to the lateral direction in top plan view, so that each of two lateral sides of the suspension frame is formed as an approximately triangular-shaped portion by the right and left inclined member, the second lateral member and the longitudinal member. This makes it possible to improve the overall rigidity of the suspension subframe to effectively receive loads from the suspension arms, while reducing the overall weight of the suspension subframe.

In order to achieve the above object, according to a third aspect of the present invention, there is provided a suspension subframe structure of a vehicle for supporting a plurality of suspension arms of a pair of right and left multi-link suspension systems. The suspension subframe structure comprises first and second lateral members provided in spaced-apart relation to each other in a longitudinal direction of a vehicle body and each extending in a lateral direction of the vehicle body, a pair of longitudinal members extending in the longitudinal direction in such a manner that one of the longitudinal members connects respective left ends of the first and second lateral members, and the other longitudinal member connects respective right ends of the first and second lateral members, and right and left inclined members each extending obliquely relative to the lateral direction in top plan view to connect a respective one of the right and left ends of the first lateral member with a laterally intermediate portion of the second lateral member, wherein each of the right and left inclined members has one end which is joined to a respective one of the right and left ends of the first lateral member to form a suspension-arm support portion therebetween.

The suspension subframe structure of the present invention comprises the pair of longitudinal members, and the right and left inclined members each extending obliquely relative to the lateral direction in top plan view to connect the respective one of the right and left ends of the first lateral member with the laterally intermediate portion of the second lateral member, wherein the suspension-arm support portion is formed in the joined portion between the one end of each of the right and left inclined members and the respective one of the right and left ends of the first lateral member. Thus, when large input loads are applied to the suspension-arm support portions in the lateral direction during turning of the vehicle, the loads applied to the suspension-arm support portions are received by the right and left inclined members and then the received loads are transmitted to the second lateral member through the right and left inclined members, so as to effectively receive the load by these members. Further, the right and left inclined members and the first and second lateral members make up a frame portion capable of effectively receiving loads. This makes it possible to improve the overall rigidity of the suspension subframe for supporting the suspension arms, while reducing the overall weight of the suspension subframe.

As above, the suspension subframe structure of the present invention can improve the overall rigidity of the suspension subframe to effectively receive input loads from the suspension arms, while reducing the overall weight of the suspension subframe.

These and other objects, features and advantages of the present invention will become more apparent upon reading the following detailed description along with the accompanying drawings.

BRIEF DESCRIPTION OF THE DRAWINGS

FIG. 17 is a perspective view showing an assembly of the front lateral member, the reinforcing inclined members, the rear lateral member and right and left longitudinal members in the suspension subframe structure according to the second embodiment, when viewed from a rear and left side thereof and obliquely from thereabove.

DETAILED DESCRIPTION OF PREFERRED EMBODIMENT OF THE INVENTION

With reference to the accompanying drawings, the present invention will now be described based on preferred embodiments thereof.

Figure 1:
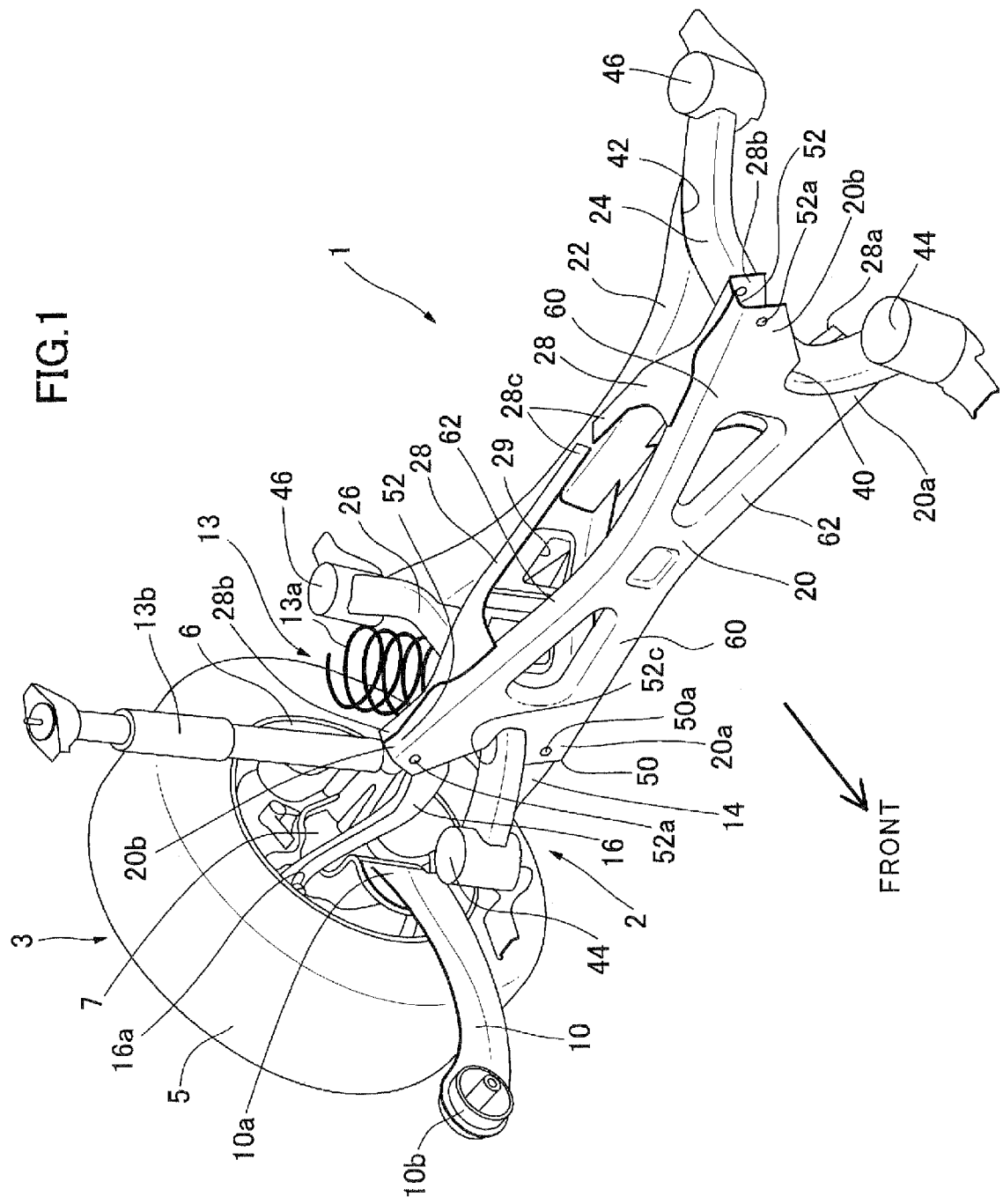
FIG. 1 is a perspective view showing a rear underbody structure of a vehicle employing a suspension subframe structure according to a first embodiment of the present invention, when viewed from a front and left side thereof and obliquely from thereabove.
Figure 2:
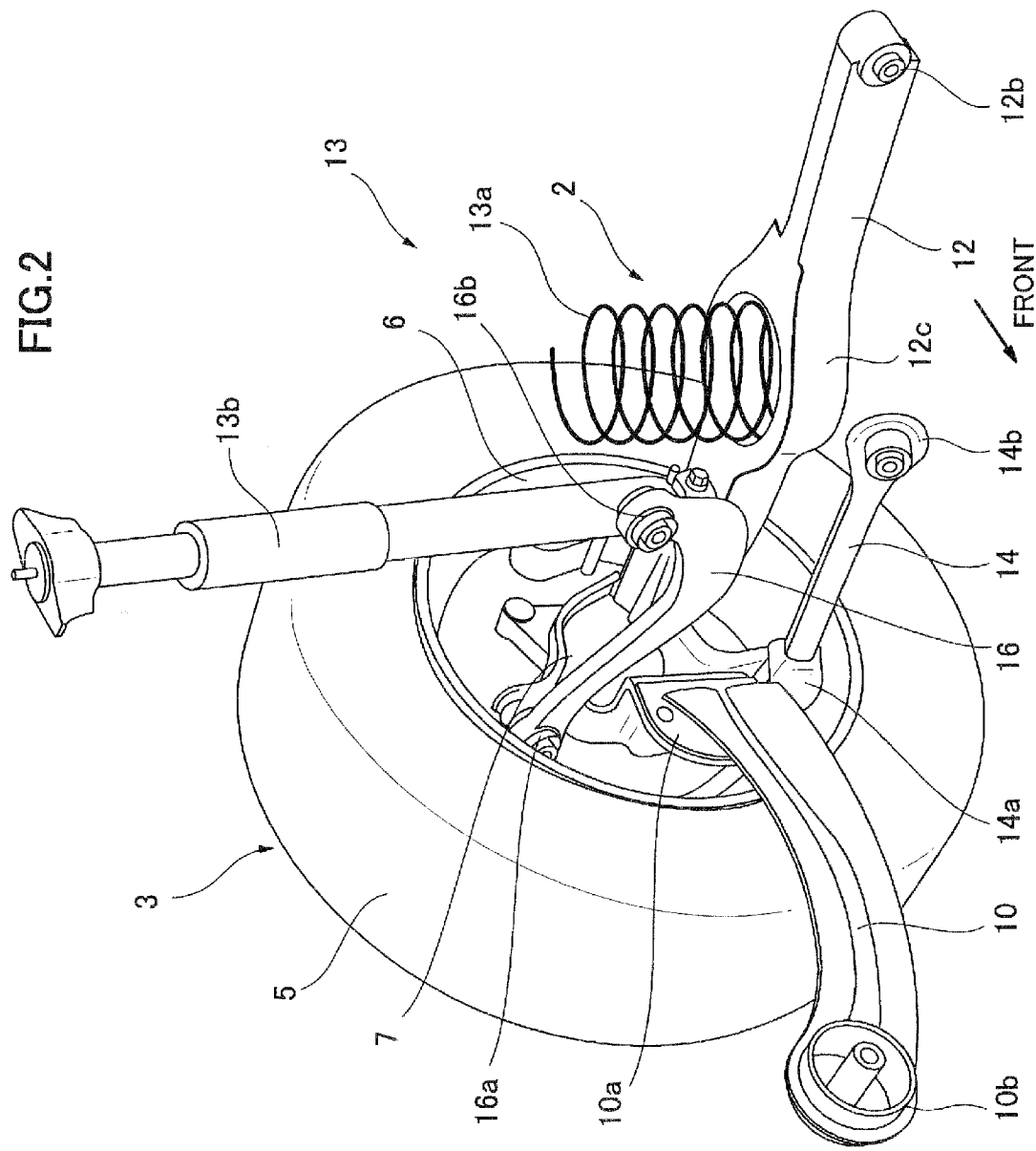
FIG. 2 is a perspective view showing a right rear suspension system and a right rear road-wheel assembly mounted to the suspension subframe structure according to the first embodiment, when viewed from a front and left side thereof and obliquely from thereabove.
Figure 3:
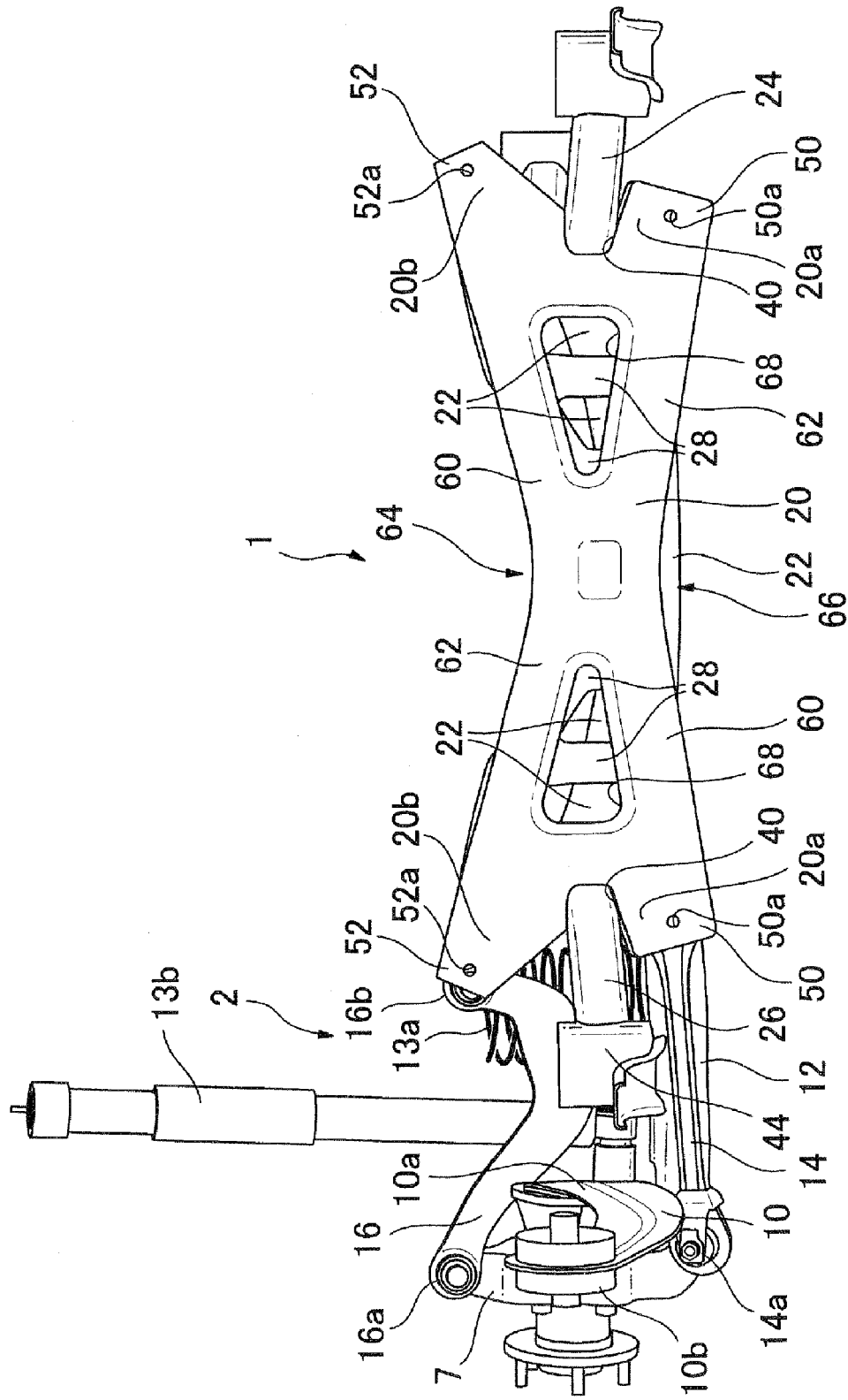
FIG. 3 is a front view showing the rear underbody structure employing the suspension subframe structure according to the first embodiment.

Firstly, with reference to FIGS. 1 to 3, a rear underbody structure of a vehicle employing a suspension subframe structure according to a first embodiment of the present invention will be described. FIG. 1 is a perspective view showing the rear underbody structure employing the suspension subframe structure according to the first embodiment, when viewed from a front and left side thereof and obliquely from thereabove. FIG. 2 is a perspective view showing a right rear suspension system and a right rear road-wheel assembly mounted to the suspension subframe structure according to the first embodiment, when viewed from a front and left side thereof and obliquely from thereabove, and FIG. 3 is a front view showing the rear underbody structure employing the suspension subframe structure according to the first embodiment.

As shown in FIG. 1, the rear underbody structure employing the suspension subframe structure according to the first embodiment comprises a rear suspension subframe 1, a pair of right and left rear suspension systems 2 (only a right rear suspension system is illustrated in FIG. 1), and a pair of right and left rear road-wheel assemblies 3 (only a right rear road-wheel assembly is illustrated in FIG. 1). In the following description, as for a pair of components arranged bilaterally symmetrically (e.g., the right and left rear suspension systems 2 and the right and left rear road-wheel assemblies 3), only one of the components will be mainly described, and detailed description about the other component will be omitted on a case-by-case basis. Further, respective components of the right and left rear suspension systems 2 will be distinguished from each other by appending "right" and "left", respectively, to each component name, according to need.

As shown in FIGS. 1 and 2, the rear road-wheel assembly 3 comprises a tire 5, a wheel (disk wheel) 6 and a road-wheel support member 7.

The rear suspension system 2 includes a trailing arm 10 which has a rear end 10a mounted to the road-wheel support member 7, and extends from the rear end 10a in a frontward direction of a vehicle body (not shown) to have a front end 10b mounted to the vehicle body.

The rear suspension system 2 also includes a rear lower arm 12 disposed on a rearward side thereof to extend in a widthwise (i.e., lateral) direction of the vehicle body. The rear lower arm 12 has an outward end 12a mounted to the road-wheel support member 7, and an inward end 12b mounted to the rear suspension subframe 1. The rear suspension system 2 further includes a shock absorbing mechanism 13 comprised of a coil spring 13a and a damper 13b and mounted to the rear lower arm 12. The spring 13a has a lower end received in a spring-receiving portion 12c of the rear lower arm 12, and an upper end mounted to the vehicle body. The damper 13b has a lower end mounted to the road-wheel support member 7, and an upper end mounted to the vehicle body.

The rear suspension system 2 further includes a front lower arm 14 disposed on a frontward and lower side thereof to extend in the lateral direction. The front lower arm 14 has an outward end 14a mounted to the road-wheel support member 7, and an inward end 14b mounted to the rear suspension subframe 1.

The rear suspension system 2 further includes a front upper arm 16 disposed on a frontward and upper side thereof to extend in the lateral direction. The front upper arm 16 has an outward end 16a mounted to the road-wheel support member 7, and an inward end 16b mounted to the rear suspension subframe 1.

Figure 4:
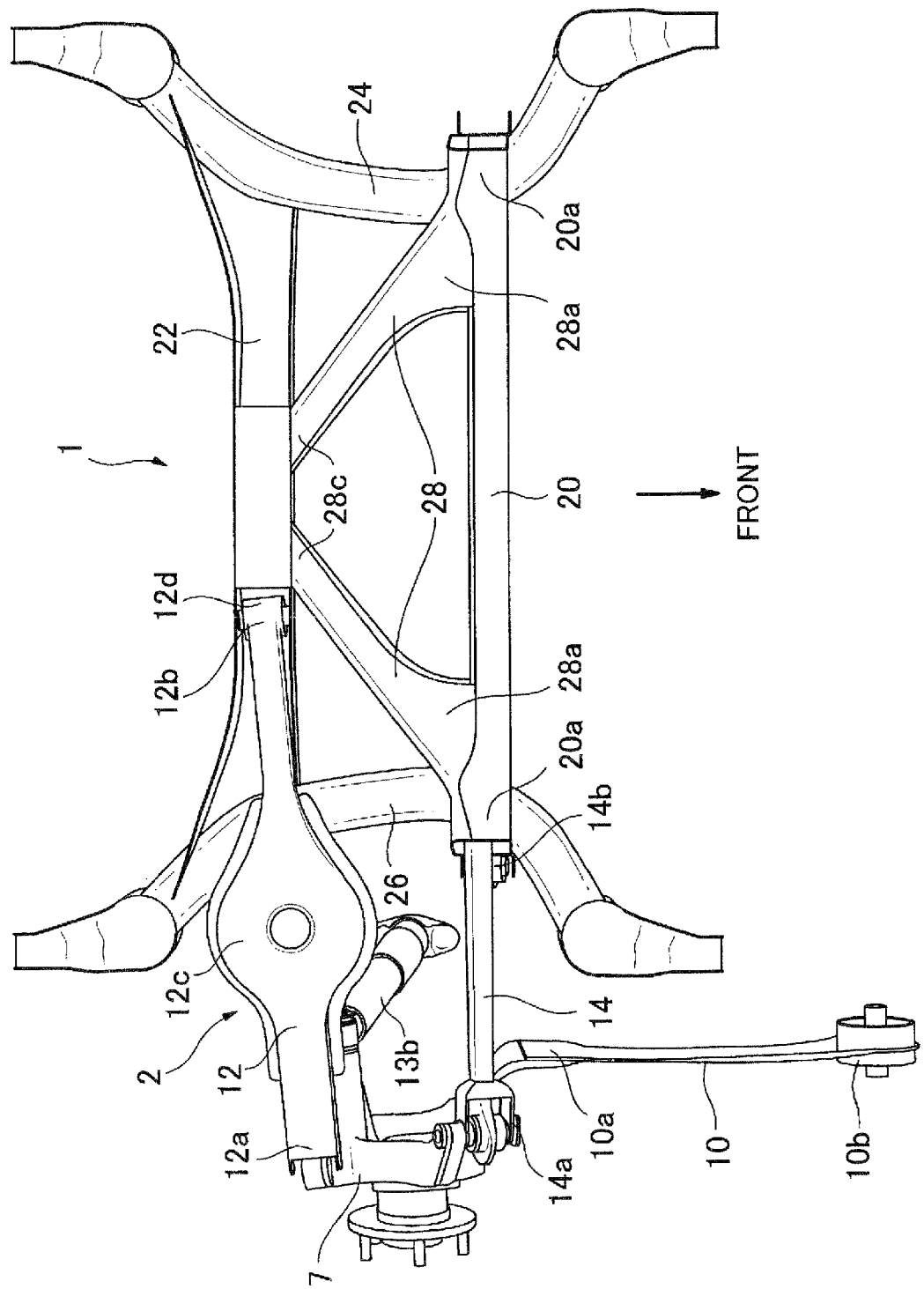
FIG. 4 is a bottom view showing the rear underbody structure employing the suspension subframe structure according to the first embodiment.
Figure 5:
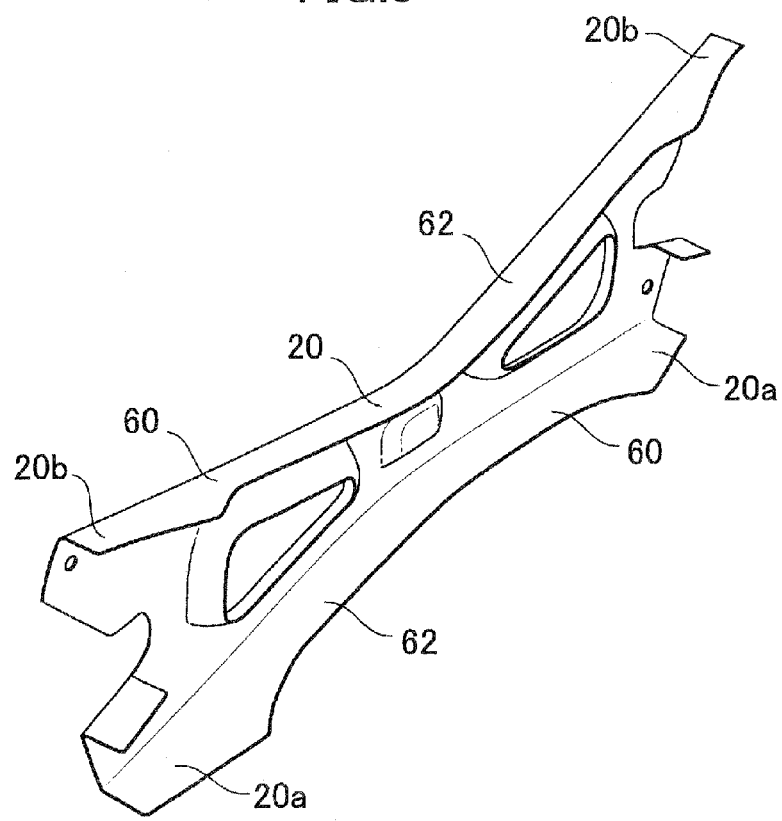
FIG. 5 is a perspective view singly showing a front lateral member in the suspension subframe structure according to the first embodiment, when viewed from a rear and left side thereof and obliquely from thereabove.
Figure 6:
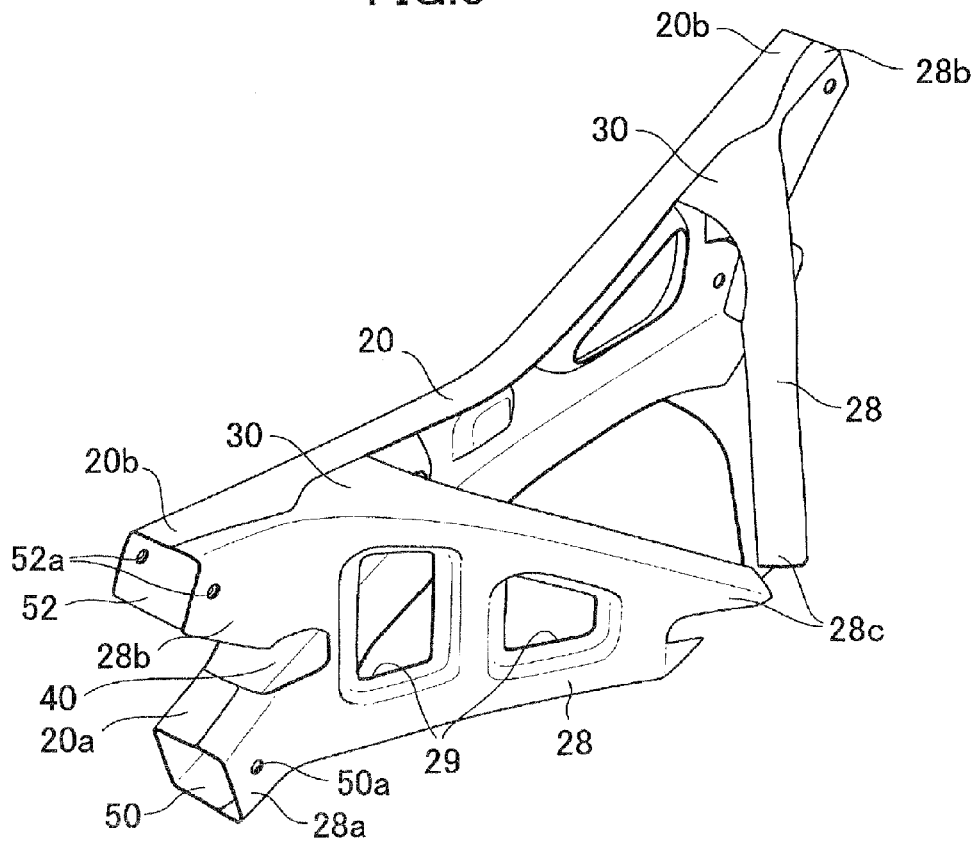
FIG. 6 is a perspective view showing an assembly of the front lateral member and right and left reinforcing inclined members in the suspension subframe structure according to the first embodiment, when viewed from a rear and left side thereof and obliquely from thereabove.
Figure 7:
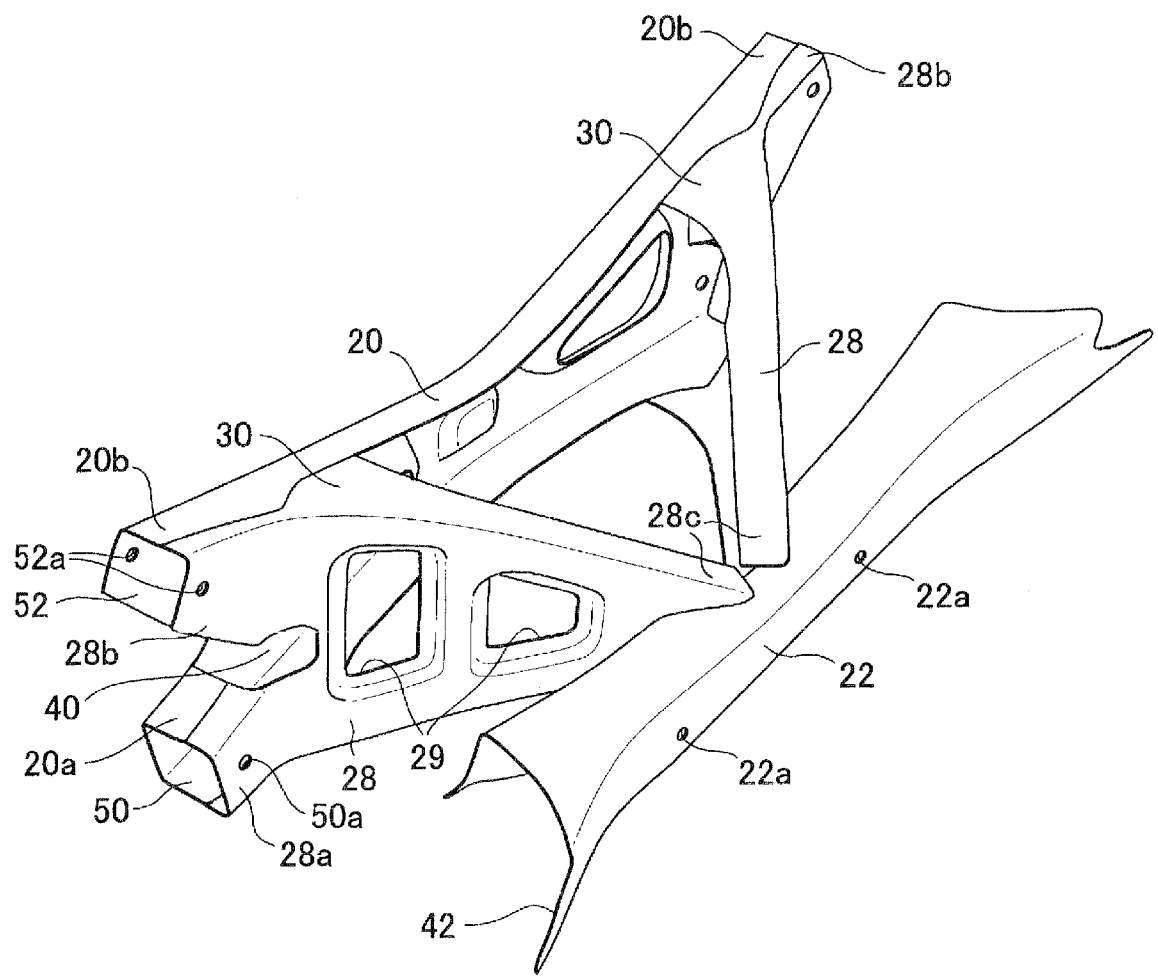
FIG. 7 is a perspective view showing an assembly of the front lateral member, the reinforcing inclined members and a rear lateral member in the suspension subframe structure according to the first embodiment, when viewed from a rear and left side thereof and obliquely from thereabove.
Figure 8:
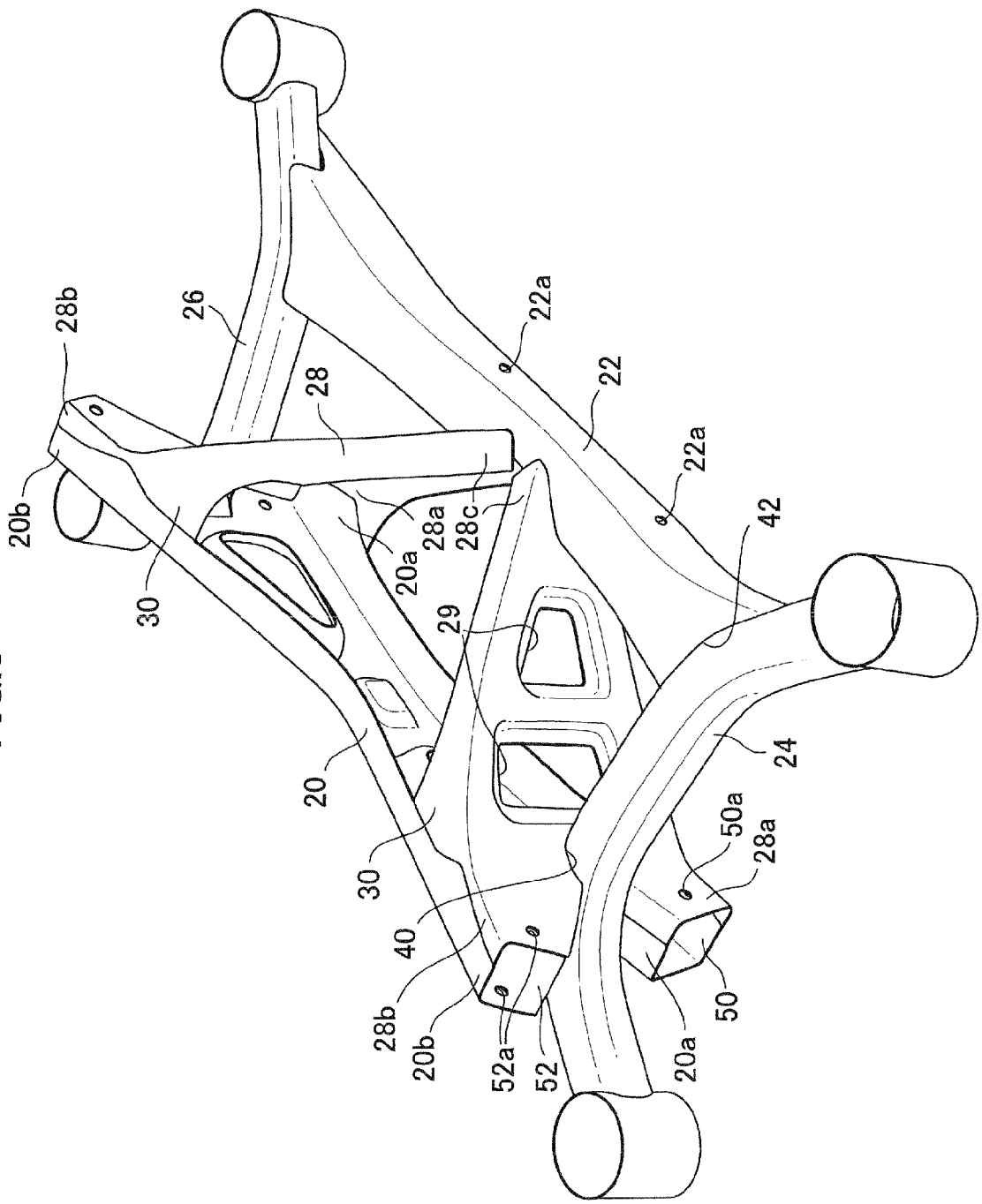
FIG. 8 is a perspective view showing an assembly of the front lateral member, the reinforcing inclined members, the rear lateral member and right and left longitudinal members in the suspension subframe structure according to the first embodiment, when viewed from a rear and left side thereof and obliquely from thereabove.
Figure 9:
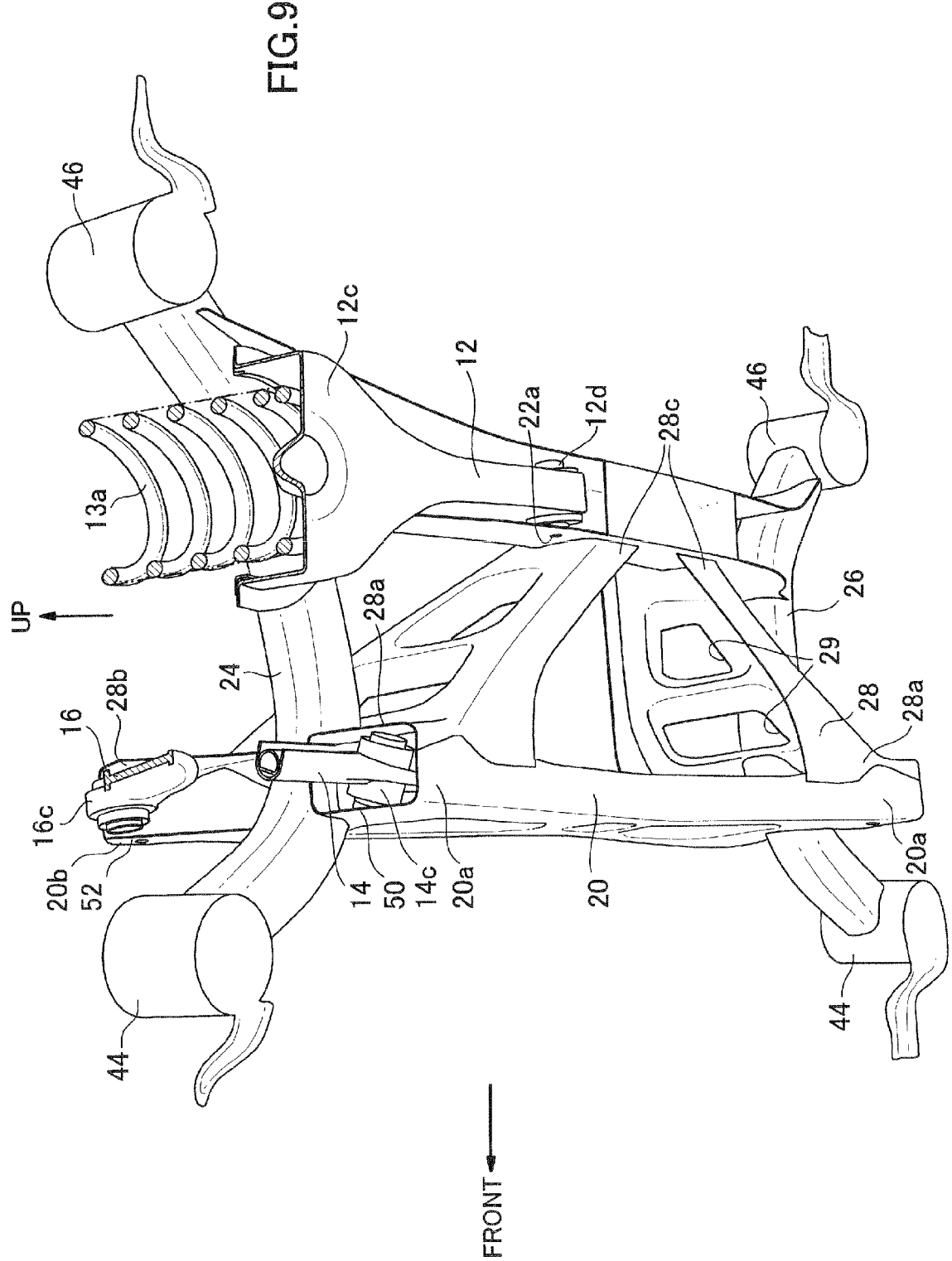
FIG. 9 is a perspective view showing the suspension subframe structure according to the first embodiment, when viewed from therebelow and from a right side thereof.
Figure 10:
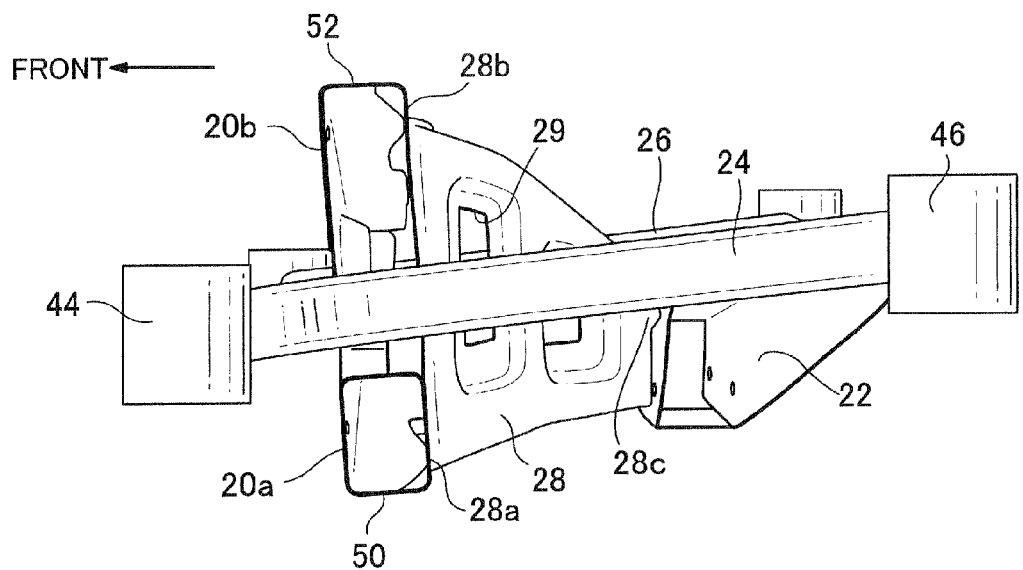
FIG. 10 is a left side view showing the suspension subframe structure according to the first embodiment.

Mainly with reference to FIGS. 4 to 10, a structure of the rear suspension subframe 1 will be described below. FIG. 4 is a bottom view showing the rear underbody structure employing the suspension subframe structure according to the first embodiment, and FIG. 5 is a perspective view singly showing a front lateral member in the suspension subframe structure according to the first embodiment, when viewed from a rear and left side thereof and obliquely from thereabove. FIG. 6 is a perspective view showing an assembly of the front lateral member and right and left reinforcing inclined members in the suspension subframe structure according to the first embodiment, when viewed from a rear and left side thereof and obliquely from thereabove, and FIG. 7 is a perspective view showing an assembly of the front lateral member, the reinforcing inclined members and a rear lateral member in the suspension subframe structure according to the first embodiment, when viewed from a rear and left side thereof and obliquely from thereabove. FIG. 8 is a perspective view showing an assembly of the front lateral member, the reinforcing inclined members, the rear lateral member and right and left longitudinal members in the suspension subframe structure according to the first embodiment, when viewed from a rear and left side thereof and obliquely from thereabove. FIG. 9 is a perspective view showing the suspension subframe structure according to the first embodiment, when viewed from therebelow and from a right side thereof, and FIG. 10 is a left side view showing the suspension subframe structure according to the first embodiment.

As shown in FIGS. 1, 3 and 4, the rear suspension subframe 1 comprises a front lateral member 20 disposed on a frontward side of the rear suspension subframe 1 to extend in the lateral direction, a rear lateral member 22 disposed on a rearward side of the rear suspension subframe 1 to extend in the lateral direction, a left longitudinal member 24 disposed on a left side of the rear suspension subframe 1 to extend in a frontward-rearward (i.e., longitudinal) direction of the vehicle body, a right longitudinal member 26 disposed on a right side of the rear suspension subframe 1 to extend in the longitudinal direction, and right and left reinforcing inclined members 28 each extending obliquely relative to the lateral direction in top plan view between the front lateral member 20 and the rear lateral member 22 to connect the front lateral member 20 and the rear lateral member 22.

As shown in FIG. 5, the front lateral member 20 is a single-piece member generally formed in a cross-sectionally angular C shape having an opening facing rearwardly. As shown in FIG. 6, each of the reinforcing inclined members 28 is a single-piece member generally formed in a cross-sectionally angular C shape having an opening facing frontwardly. As shown in FIGS. 1, 4 and 6, the front lateral member 20 and each of the reinforcing inclined members 28 are arranged such that the respective openings thereof are positioned in opposed relation to each other, and fixed to each other by welding.

As shown in FIGS. 1 and 6, in a state after the front lateral member 20 and each of the reinforcing inclined members 28 are fixed together, a portion indicated by the reference numeral 30 is formed to have a closed cross-section so as to increase the overall rigidity of the rear suspension subframe 1. As shown in FIG. 7, the rear lateral member 22 is generally formed in a cross-sectionally angular C shape having an opening facing downwardly. As shown in FIGS. 1, 4 and 7, each of the reinforcing inclined members 28 has a rear end 28c fixed to the rear lateral member 22 by welding.

As shown in FIG. 7, right and left open portions 40 (only a left open portion appears in FIG. 7) are formed between the front lateral member 20 and the right reinforcing inclined member 28 and between the front lateral member 20 and the left reinforcing inclined member 28, respectively. These open portions 40 are formed by connecting the reinforcing inclined members 28 to the front lateral member 20. Specifically, each of the open portions 40 is a combination of a front region formed by the front lateral member 20, and a rear region formed by a corresponding one of the reinforcing inclined members 28. Further, right and left open portions 42 are formed by respective opposite lateral edges of the rear lateral member 22.

The left and right longitudinal members 24, 26 are mounted to the left and right open portions 40, respectively, as will be described later. Each of the open portions 40 serving as mounting portions for the longitudinal members 24, 26 is defined by a lower opening facing upwardly, an upper opening facing downwardly, and a laterally inward opening facing outwardly. As shown in FIG. 3, each of the open portions 40 is defined by an opening facing frontwardly and rearwardly (i.e., has a laterally inwardly concaved shape), when viewed in the longitudinal direction. Although each of the open portions 40 in the first embodiment is formed to have an open cross-section, it may be formed to have a closed cross-section to further increase the overall rigidity of the rear suspension subframe 1.

Then, the left longitudinal member 24 is fixedly mounted to the left open portions 40, 42 illustrated in FIG. 7 by welding, and the right longitudinal member 26 is fixedly mounted to the right openings 40, 42 by welding. In this manner, the rear suspension subframe 1 as shown in FIGS. 1 and 8 is formed. Each of the left and right longitudinal members 24, 26 has a front end and a rear end provided with a front mount portion 44 and a rear mount portion 46, respectively. The rear suspension subframe 1 is mounted to the vehicle body through the front and rear mount portions 44, 46.

As shown in FIGS. 1, 3 and 8, the front lateral member 20 has right and left ends each branched into a lower end 20a and an upper end 20b, and a front end of each of the reinforcing inclined members 28 is also formed as branched lower and upper ends 28a, 28b. The ends 20a, 20b of the front lateral member 20 are connected to respective ones of the ends 28a, 28b to form a mounting portion 50 for the front lower arm 14 and a mounting portion 52 for the front upper arm 16.

More specifically, as shown in FIGS. 6 and 10, the front lateral member 20 has right and left lower ends 20a (each formed in a cross-sectionally angular C shape having an opening facing rearwardly), and the right and left reinforcing inclined members 28 have right and left lower ends 28a (each formed in a cross-sectionally angular C shape having an opening facing frontwardly), respectively. The right and left lower ends 20a of the front lateral member 20 are joined to respective ones of the right and left lower ends 28a of the right and left reinforcing inclined members 28, to form right and left mounting portions 50 for the right and left front lower arms 14 (right and left front-lower-arm support portions 50) each having a closed cross-section.

Further, as shown in FIGS. 6 and 10, the front lateral member 20 has right and left upper ends 20b (each formed in a cross-sectionally L shape), and the right and left reinforcing inclined members 28 have right and left upper ends 28b (each formed in a cross-sectionally L shape), respectively. The right and left upper ends 20b of the front lateral member 20 are joined to respective ones of the right and left upper ends 28b of the right and left reinforcing inclined members 28 to form right and left mounting portions 52 for the right and left front upper arms 16 (right and left front-upper-arm support portions 52) each having an open cross-section with an opening facing downwardly.

As shown in FIGS. 1, 3 and 8, each of the mounting portions 50 is formed with a hole 50a for mounting a rubber bush 14c (see FIG. 9) provided at the laterally inward end of the front lower arm 14, and each of the mounting portions 52 is formed with a hole 52a for mounting a rubber bush 16c (see FIG. 9) provided at the laterally inward end of the front upper arm 16. Then, as shown in FIG. 9, the front lower arms 14 and the front upper arms 16 are mounted to the assembly of the front lateral member 20 and the reinforcing inclined members 28 (only the right front lower arm 14 and the right front upper arm 16 are shown in FIG. 9).

As shown in FIGS. 8 and 9, the rear lateral member 22 is also formed with two holes 22a. Thus, as shown in FIGS. 4 and 9, a rubber bush 12d provided at the laterally inward end of the rear lower arm 12 is mounted to the rear lateral member 22 through one of the hole 22a (only the right rear lower arm 12 is shown in FIGS. 4 and 9). The rear end 28c of each of the reinforcing inclined members 28 is weldingly fixed to the rear lateral member 22 in a vicinity of this mounting portion for the rear lower arm 12 (rear-lower-arm support portion) to increase rigidity of the mounting portion 22b for mounting the rear lower arm 12 to the rear suspension subframe 1. It is understood that the rear end 28c of each of the reinforcing inclined members 28 may be fixed to the same position as that of the mounting portion 22b.

As shown in FIGS. 1, 3 and 5, the front lateral member 20 is formed to have a frame portion 60 extending approximately linearly to diagonally connect the left upper end 20b provided with the mounting portion 52 for the left front upper arm 16 and the right lower end 20a provided with the mounting portion 50 for the right front lower arm 14, and a frame portion 62 extending approximately linearly to diagonally connect the right upper end 20b provided with the mounting portion 52 for the right front upper arm 16 and the left lower end 20a provided with the mounting portion 50 for the left front lower arm 14. Thus, based on the frame portions 60, 62, the front lateral member 20 is formed in a generally X shape.

More specifically, as shown in FIG. 3, the front lateral member 20 has an upper portion and a lower portion formed, respectively, as a downwardly-concaved portion 64 and an upwardly concaved portion 66, in such a manner that a vertical length (i.e., height dimension) of the front lateral member 20 gradually decreases from each of the right and left ends thereof in a laterally inward direction of the vehicle body. Further, the front lateral member 20 is formed with a pair of through-holes 68 each having a vertical length (i.e., height dimension) which gradually decreases in the laterally inward direction. Based on the concaved portions 64, 66 and the through-holes 68, the front lateral member 20 is formed in a generally X shape in front view.

As shown in FIG. 3, each of the right and left ends of the front lateral member 20 is formed such that each of the right and left front-upper-arm support portions is connected to a corresponding one of the right and left front-lower-arm support portions in an upward-downward direction. Further, as shown in FIG. 10, the front lateral member 20 is provided with the right and left mounting portions 50 for the right and left front lower arms 14 and the right and left mounting portions 52 for the right and left front upper arms 16, wherein each of the right and left mounting portions 50 and a corresponding one of the right and left mounting portions 52 are located above and below a corresponding one of the right and left longitudinal members 24, 26 in such a manner as to interpose the longitudinal member therebetween.

In the same manner, the right and left reinforcing inclined members 28 are provided, respectively, with the right mounting portions 50, 52 for the right front lower arm 14 and the right front upper arm 16, and the left mounting portions 50, 52 for the left front lower arm 14 and the left front upper arm 16, wherein each of the right and left mounting portions 50 and a corresponding one of the right and left mounting portions 52 are located above and below a corresponding one of the right and left longitudinal members 24, 26 in such a manner as to interpose the longitudinal member therebetween, as mentioned above. Further, as shown in FIGS. 4 and 8, each of the reinforcing inclined members 28 is arranged to extend from the corresponding mounting portions 50, 52 thereof in the laterally inward direction and obliquely rearwardly in top plan view, and fixed to a laterally intermediate portion of the rear lateral member 22 through the rear end 28c thereof.

Further, as shown in FIG. 8, each of the reinforcing inclined members 28 is formed to have a height dimension which gradually decreases in a direction from the mounting portions 50, 52 thereof in a corresponding one of the right and left ends of the front lateral member 20 toward a laterally intermediate portion of the rear lateral member 22. As shown in FIG. 8, each of the reinforcing inclined members 28 is formed with two through-holes 29 each having a height dimension which gradually decreases in the direction from the mounting portions 50, 52 thereof in a corresponding one of the right and left ends of the front lateral member 20 toward the laterally intermediate portion of the rear lateral member 22.

Figure 11:
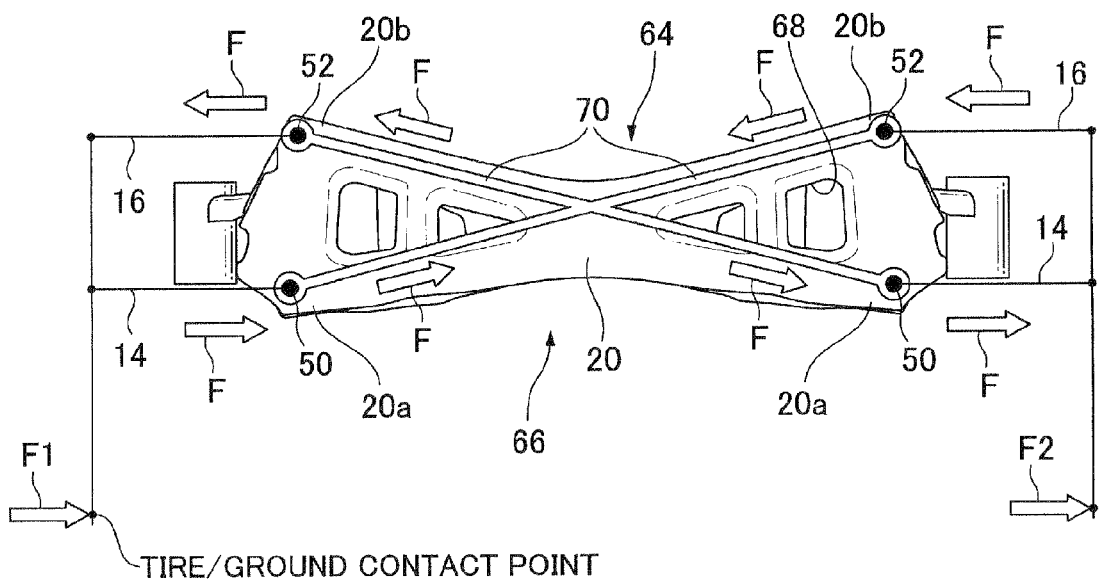
FIG. 11 is an explanatory front view showing one example of an operation of the suspension subframe structure according to the first embodiment.

With reference to FIG. 11, a function and advantage of the suspension subframe structure according to the first embodiment will be described below. FIG. 11 is an explanatory front view showing one example of an operation of the suspension subframe structure according to the first embodiment.

The right and left mounting portions 50 for the right and left front lower arms 14 (right and left front-lower-arm support portions 50) are provided in respective ones of the right and left lower ends 20a of the front lateral member 20, and the right and left mounting portions 52 for the right and left front upper arms 16 (right and left front-upper-arm support portions 52) are provided in respective ones of the right and left upper ends 20b of the front lateral member 20. Further, based on the concaved portions 64, 66 and the through-holes 68, the front lateral member 20 is formed to extend in a generally X shape in front view, as mentioned above. For example, the front lateral member 20 extends along the diagonal lines indicated by the reference numeral 70 in FIG. 11.

Given that loads F1, F2 are applied to the road-wheel assemblies 3 at tire/ground contact points thereof, respectively, during turning of the vehicle. In this case, a load F is transmitted to each of the right and left front lower arms 14 and the right and left front upper arms 16, in the direction as shown in FIG. 11. Specifically, during clockwise turning of the vehicle on an assumption that the right and left road-wheel assemblies 3 have the same phase at a tire/ground contact point, a load compressing the front lateral member 20 is applied to a left lower arm 14 and to a right upper arm 16 diagonally aligned with the left lower arm 14, and a load tensioning the front lateral member 20 is applied to a left upper arm 16 and to a right lower arm 14 diagonally aligned with the left upper arm 16.

In the suspension subframe structure according to the first embodiment, as measures against such lateral loads, the front lateral member 20 is formed to extend in a generally X shape in front view. This makes it possible to allow the front lateral member 20 to efficiently receive loads from the arms 14, 16 in diagonal directions, and effectively cancel out the laterally oppositely directed loads. More specifically, the front lateral member 20 is formed to allow loads to be transmitted diagonally between the mounting portion 50 for the left front lower arm 14 and the mounting portion 52 for the right front upper arm 16 and diagonally between the mounting portion 50 for the right front lower arm 14 and the mounting portion 52 for the left front upper arm 16.

Thus, even if large input loads are applied to the right and left front lower arms 14 and the right and left front upper arms 16 during turning of the vehicle, the front lateral member 20 can effectively support the arms 14, 16 to cancel out the laterally oppositely directed loads. This makes it possible to improve the overall rigidity of the rear suspension subframe 1 to effectively receive loads from the arms 14, 16, while reducing the overall weight of the rear suspension subframe 1.

In the suspension subframe structure according to the first embodiment, each of the right and left rear suspension system 2 is a multi-link rear suspension, and the right and left mounting portions 50 for the right and left front lower arms 14 and the right and left mounting portion 52 for the right and left front upper arms 16 are formed in the front lateral member 20. Thus, during turning of the vehicle, relatively large input loads of the front lower and upper arms 14, 16 can be effectively received by the front lateral member 20.

In the suspension subframe structure according to the first embodiment, each of the right and left rear suspension system 2 is a multi-link rear suspension which comprises the trailing arm 10 extending from the road-wheel support member 7 in the frontward direction of the vehicle body, and the front lower arm 14 and the front upper arm 16 each extending from the road-wheel support member 7 in the laterally inward direction of the vehicle body, and the right and left mounting portions 50, 52 is provided in the front lateral member 20 to support the front lower and upper arms 14, 16. Thus, during turning of the vehicle, relatively large input loads of the front lower and upper arms 14, 16 can be effectively received by the front lateral member 20. In addition, a part of respective ones of the right and left mounting portions 50, 52 is provided in the reinforcing inclined members 28. Thus, during turning of the vehicle, the relatively large input loads of the front lower and upper arms 14, 16 can be effectively received by the reinforcing inclined members 28 and the rear lateral member 22.

In the suspension subframe structure according to the first embodiment, each of the right and left rear suspension system 2 is a multi-link rear suspension which comprises the front lower and upper arms 14,16 disposed on a frontward side thereof, and the rear lower arm 12 disposed on a rearward side thereof, wherein the rear lower arm 12 is supported by the rear lateral member 22 in a vicinity of a position where each of the reinforcing inclined members 28 is connected to the rear lateral member 22. This makes it possible to further increase rigidity for supporting the rear lower arm 12, by the reinforcing inclined members 28 connected to the rear lateral member 22. The rear lower arm 12 may be supported by the rear lateral member 22 in the same position as that where each of the reinforcing inclined members 28 is connected to the rear lateral member 22, to obtain the same advantage.

The suspension subframe structure according to the first embodiment comprises the front lateral member 20, the rear lateral member 22, and the right and left reinforcing inclined members 28. The right reinforcing inclined member 28 is arranged to extend in the lateral direction and obliquely rearwardly in top plan view to connect the right end of the front lateral member 20 and the laterally intermediate portion of the rear lateral member 22, and the left reinforcing inclined member 28 is arranged to extend in the laterally direction and obliquely rearwardly in top plan view to connect the left end of the front lateral member 20 and the laterally intermediate portion of the rear lateral member 22, wherein the right and left lower ends 20a of the front lateral member 20 are connected to respective ones of the right and left lower ends 28a of the right and left reinforcing inclined members 28 to form the right and left mounting portions 50 for the right and left front lower arms 14 (right and left front-lower-arm support portions 50), and the right and left upper ends 20b of the front lateral member 20 are connected to respective ones of the right and left upper ends 28b of the right and left reinforcing inclined members 28 to form the right and left mounting portions 52 for the right and left front upper arms 16 (right and left front-upper-arm support portions 52). Thus, when large lateral input loads are applied to the respective mounting portions 50, 52 for the front lower and upper arms 14, 16 during turning of the vehicle, the loads are transmitted from the mounting portions 50, 52 to the front lateral member 20 and the reinforcing inclined members 28, and then transmitted from the reinforcing inclined members 28 to the rear lateral member 22, so that the loads can be effectively received by the front lateral member 20, the reinforcing inclined members 28 and the rear lateral member 22. That is, the reinforcing inclined members 28, the front lateral member 20 and the rear lateral member 22 make up a frame configuration capable of effectively receiving loads. This makes it possible to improve the overall rigidity of the rear suspension subframe 1 while reducing the overall weight of the rear suspension subframe 1.

In the suspension subframe structure according to the first embodiment, the lower and upper ends 28a, 28b of each of the reinforcing inclined members 28 are formed as the mounting portions 50, 52 for the front lower and upper arms 14, 16, and connected to the laterally intermediate portion of the rear lateral member 22. Thus, when large lateral input loads are applied to the respective mounting portions (support portions) 50, 52 for the front lower and upper arms 14, 16 during turning of the vehicle, the loads are transmitted from the mounting portions 50, 52 to the reinforcing inclined members 28 and then to the rear lateral member 22. Each of the reinforcing inclined members 28 extends obliquely relative to the lateral direction in top plan view, so that each of two lateral sides of the suspension frame is formed as an approximately angular-shaped portion by the rear lateral member 22, each of the reinforcing inclined members 28 and a corresponding one of the longitudinal members 24, 26. This makes it possible to improve the overall rigidity of the rear suspension subframe 1 to effectively receive loads from the front lower and upper arms 14, 16, while reducing the overall weight of the rear suspension subframe 1.

In the suspension subframe structure according to the first embodiment, the right and left mounting portions 50 for the right and left front lower arms 14 and the right and left mounting portions 52 for the right and left front upper arms 16 are integrally formed in the front lateral member 20. Thus, loads from the front lower and upper arms 14, 16 can be efficiently transmitted to the front lateral member 20. In the same manner, a part of respective ones of the right and left mounting portions 50 for the right and left front lower arms 14 and the right and left mounting portions 52 for the right and left front upper arms 16 is integrally formed in the reinforcing inclined members 28. Thus, the loads from the front lower and upper arms 14, 16 can also be efficiently transmitted to the reinforcing inclined members 28.

In the suspension subframe structure according to the first embodiment, the right and left mounting portions 50 for the right and left front lower arms 14 and the right and left mounting portions 52 for the right and left front upper arms 16 are integrally formed by the front lateral member 20 and the reinforcing inclined members 28. Thus, loads from the front lower and upper arms 14, 16 can be effectively received by the front lateral member 20, the reinforcing inclined members 28 and the rear lateral member 22 and efficiently transmitted to the front lateral member 20, the reinforcing inclined members 28 and the rear lateral member 22.

In the suspension subframe structure according to the first embodiment, each of the right and left mounting portions 52 for the right and left front upper arms 16 is formed to have a cross-sectionally angular C shape, by integrally joining each of the right and left upper ends 20b of the front lateral member 20 to a corresponding one of the right and left upper ends 28b of the right and left reinforcing inclined members 28. This makes it possible to improve rigidity of the right and left mounting portions 52 for the right and left front upper arms 16, and allow a component, such as the rubber bush 16c of the front upper arm 16 or a rotatable rod, to be installed inside the angular C-shaped cross-section portion so as to promote effective utilization of space.

In the suspension subframe structure according to the first embodiment, each of the right and left mounting portions 50 for the right and left front lower arms 14 is formed to have a closed cross-section, by integrally joining each of the right and left lower ends 20a of the front lateral member 20 to a corresponding one of the right and left lower ends 28a of the right and left reinforcing inclined members 28. This makes it possible to improve rigidity of the right and left mounting portions 50 for the right and left front lower arms 14, and allow a component, such as the rubber bush 14c of the front lower arm 14 or a rotatable rod, to be installed inside the closed cross-section portion so as to promote effective utilization of space. Generally, each of the right and left front lower arms 14 is likely to receive a larger load than that in other arm during turning of the vehicle. In the first embodiment, each of the right and left mounting portions 50 for the right and left front lower arms 14 is formed to have a closed cross-section to increase rigidity thereof. This makes it possible to effectively support the right and left front lower arms 14.

In the suspension subframe structure according to the first embodiment, a laterally intermediate portion of the front lateral member 20 has a height dimension less than that of each of the right and left ends thereof. Thus, loads applied to the front lower and upper arms 14, 16 can be efficiently transmitted through the front lateral member 20 in diagonal directions to cancel out the laterally oppositely directed loads, as mentioned above. Further, the upper and lower portions of the front lateral member 20 are formed, respectively, as downwardly-concaved and upwardly-concaved portions 64, 66. This makes it possible to remove a portion unnecessary for the diagonal load transmission to facilitate a reduction in weight of the front lateral member 20 so as to reduce the overall weight of the rear suspension subframe 1.

Further, the front lateral member 20 is formed with the pair of through-holes 68 each having a height dimension which gradually decreases in a direction from an adjacent one of the right and left ends thereof toward the laterally intermediate portion of the front lateral member 20. This makes it possible to remove a portion unnecessary for the diagonal load transmission to facilitate the reduction in weight of the front lateral member 20 so as to further reduce the overall weight of the rear suspension subframe 1.

In the suspension subframe structure according to the first embodiment, each of the reinforcing inclined members 28 is formed to have a height dimension which gradually decreases in a direction from the ends 28a, 28b thereof toward the laterally intermediate portion of the rear lateral member 22. This makes it possible to remove a portion unnecessary for transmitting loads applied to the front lower and upper arms 14, 16 to facilitate a reduction in weight of the reinforcing inclined members 28 so as to further reduce the overall weight of the rear suspension subframe 1.

Further, each of the reinforcing inclined members 28 is formed with the two through-holes 29 each having a height dimension which gradually decreases in a direction from the mounting portions 50, 52 thereof in each of the right and left ends of the front lateral member 20, toward the laterally intermediate portion of the rear lateral member 22. This makes it possible to remove a portion unnecessary for transmitting loads applied to the front lower and upper arms 14, 16 to facilitate the reduction in weight of the reinforcing inclined members 28 so as to further reduce the overall weight of the rear suspension subframe 1.

In the suspension subframe structure according to the first embodiment, each of the right and left ends of the front lateral member 20 is formed such that each of the right and left mounting portions 50 for the right and left front lower arms 14 is connected to a corresponding one of the right and left mounting portions 52 for the right and left front upper arms 16 in an upward-downward direction. This makes it possible to improve both rigidly of the front lateral member 20 and rigidity of the mounting portions (support portions) 50, 52 for the front lower and upper arms 14, 16. Further, each of the right and left ends of the right and left reinforcing inclined members 28 is formed such that each of the right and left mounting portions 50 for the right and left front lower arms 14 is connected to a corresponding one of the right and left mounting portions 52 for the right and left front upper arms 16 in an upward-downward direction. This makes it possible to improve both rigidity of the reinforcing inclined members 28 and rigidity of the mounting portions (support portions) 50, 52 for the front lower and upper arms 14, 16.

In the suspension subframe structure according to the first embodiment, each of the right and left mounting portions 50 for the right and left front lower arms 14 and a corresponding one of the right and left mounting portions 52 for the right and left front upper arms 16 are located above and below a corresponding one of the longitudinal members 24, 26 so as to interpose the longitudinal member therebetween. This makes it possible to facilitate effective utilization of space above and below the longitudinal members 24, 26 so as to reduce an overhang of each of the mounting portions (support portions) 51, 52 for the front lower and upper arms 14, 16, from a corresponding one of the longitudinal members 24, 26, to increase rigidity of the mounting portions (support portions) 51, 52 for the front lower and upper arms 14, 16.

In the suspension subframe structure according to the first embodiment, the reinforcing inclined members 28 are joined to the front lateral member 20 in a region between the front-lower-arm support portion 50 and the front-upper-arm support portion 52, and the joined portion between the front lateral member 20 and each of the right and left reinforcing inclined members 28 is joined to a corresponding one of the right and left longitudinal members 26, 24. This makes it possible to increase rigidity of the joined portion between the assembly of the front lateral member 20 and each of the reinforcing inclined members 28, and a corresponding one of the right and left longitudinal members 26, 24, while improving respective rigidities of the front lateral member 20 and the reinforcing inclined members 28, so as to increase the overall rigidity of the rear suspension subframe 1. For example, in this case, the front lateral member 20 and each of the reinforcing inclined members 28 may be joined together to have a closed cross-section in such a manner as to allow a corresponding one of the longitudinal members 24, 26 to be joined thereto, so as to further increase respective rigidities of the upper-arm and lower-arm support portions 52, 50 and the overall rigidity of the suspension subframe 1.

Figure 12:
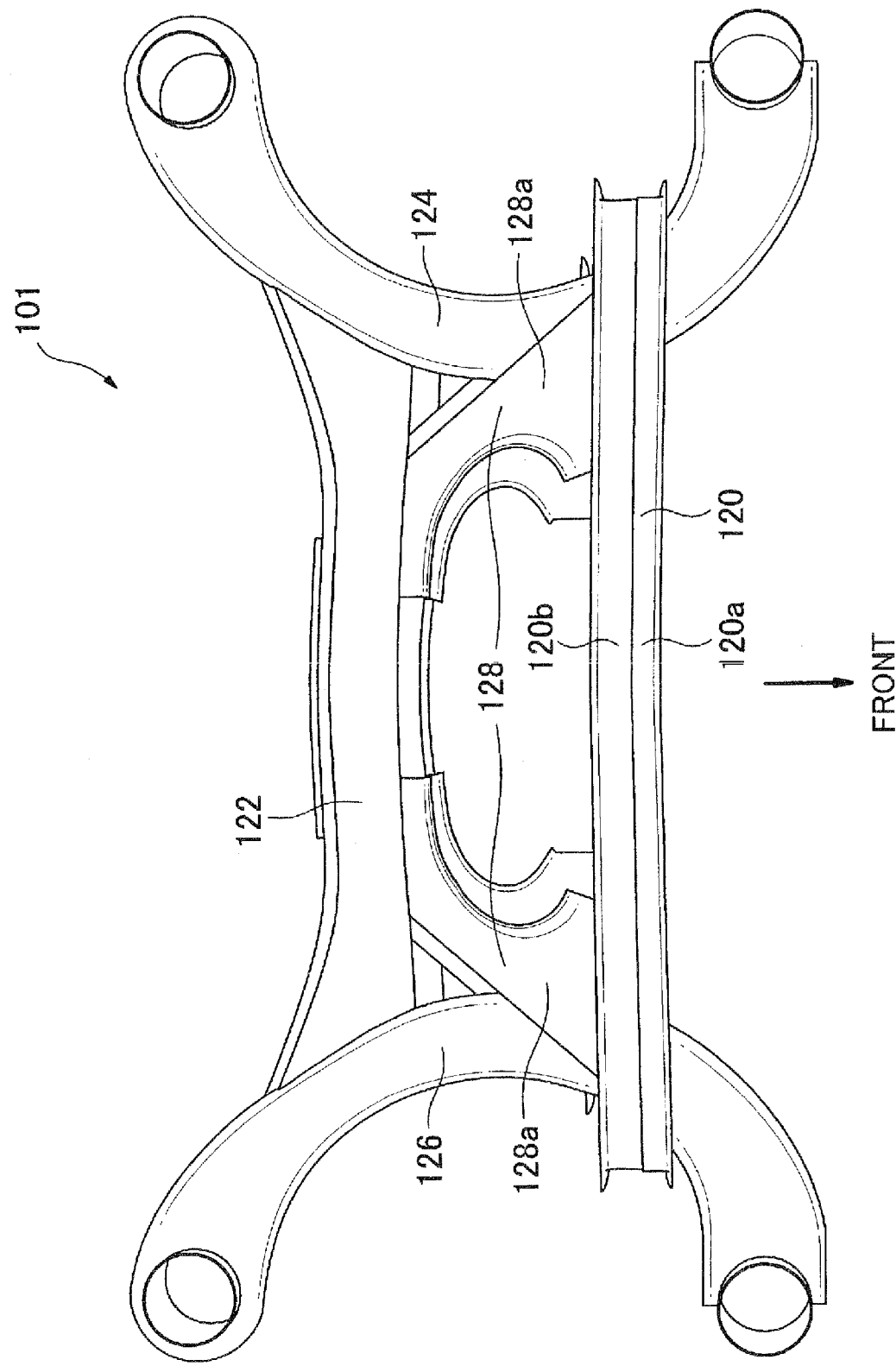
FIG. 12 is a top plan view showing a rear underbody structure of a vehicle employing a suspension subframe structure according to a second embodiment of the present invention.
Figure 13:
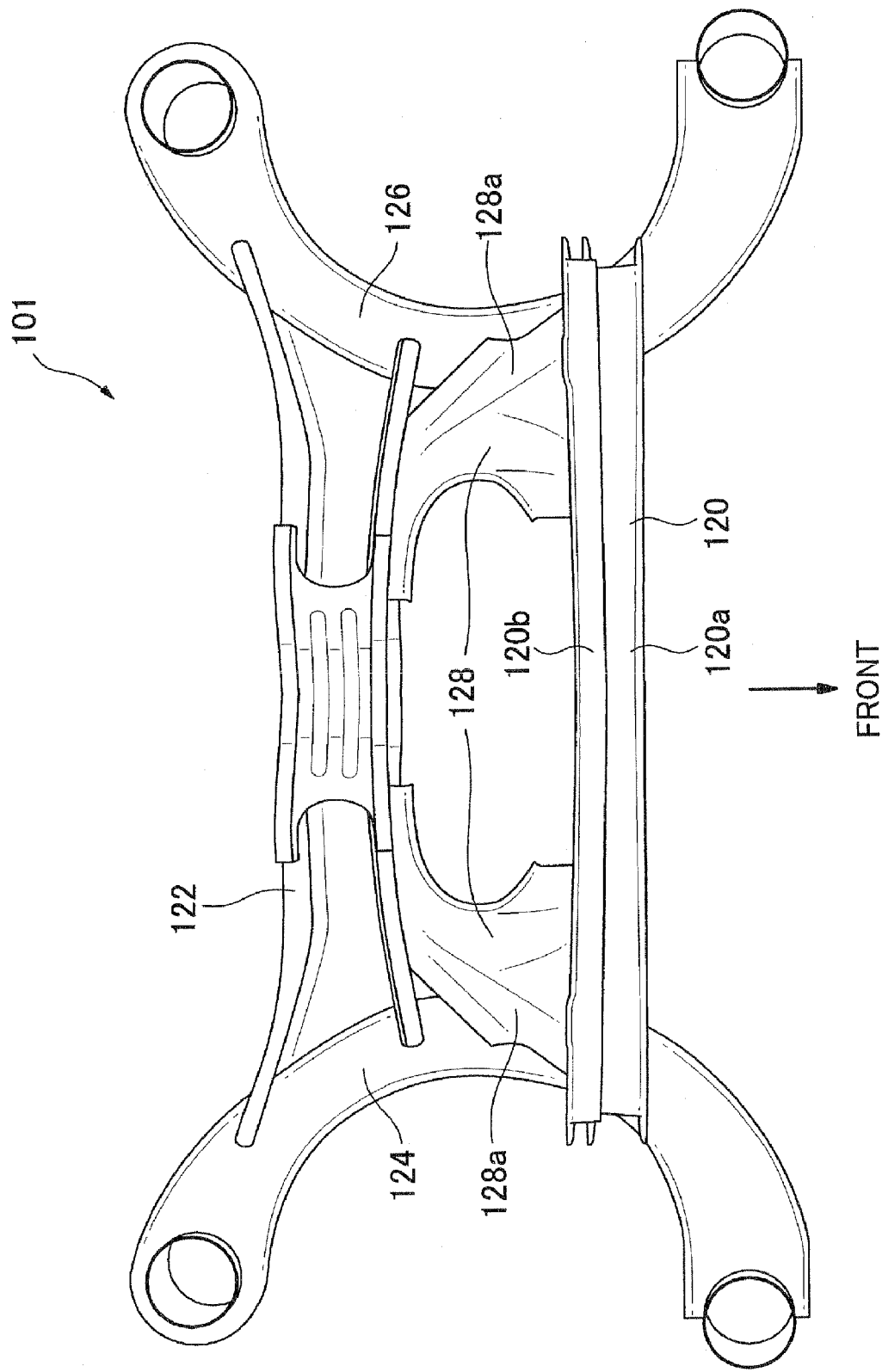
FIG. 13 is a bottom view showing the rear underbody structure employing the suspension subframe structure according to the second embodiment.
Figure 14:
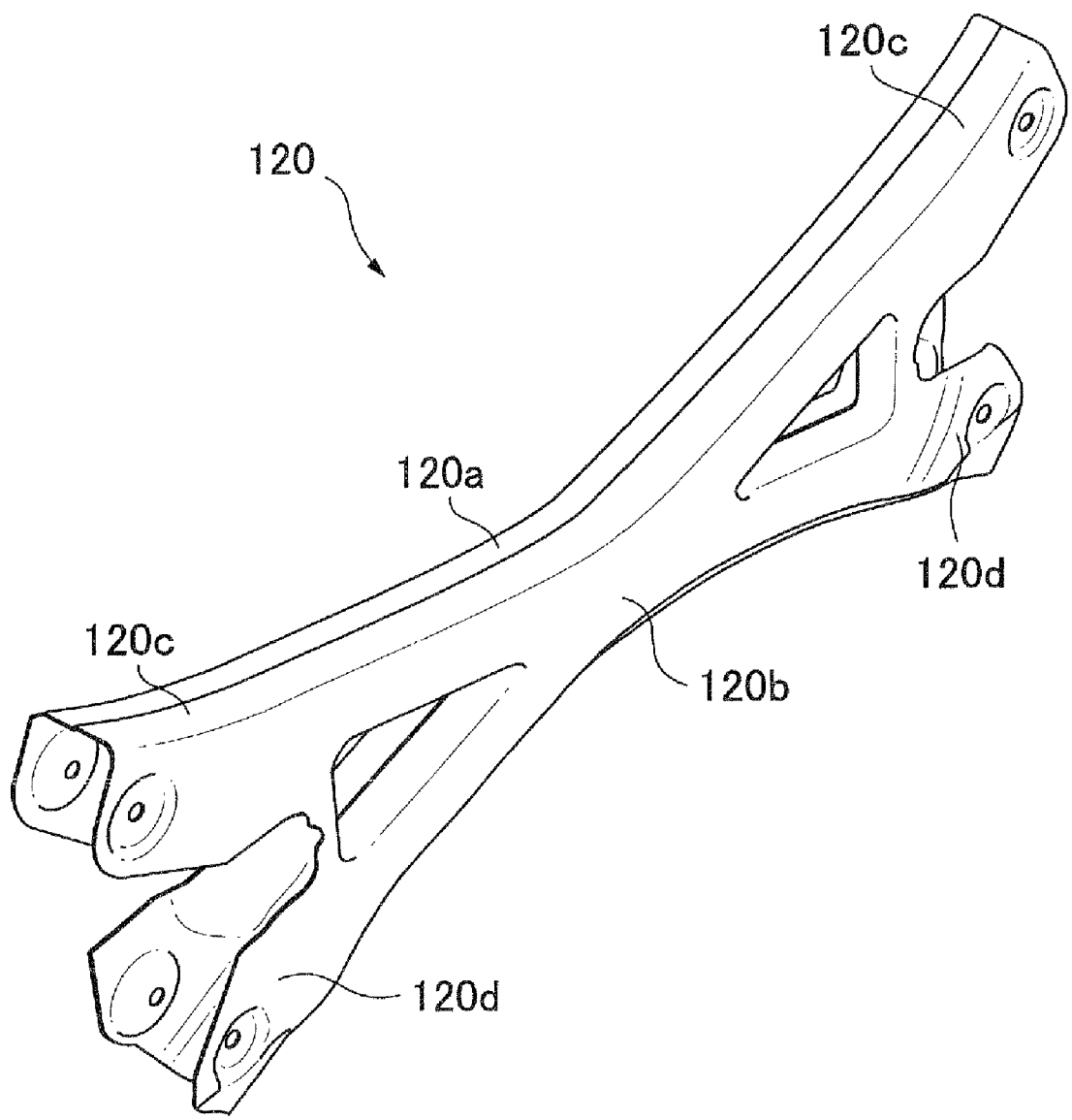
FIG. 14 is a perspective view singly showing a front lateral member in the suspension subframe structure according to the second embodiment, when viewed from a rear and left side thereof and obliquely from thereabove.
Figure 15:
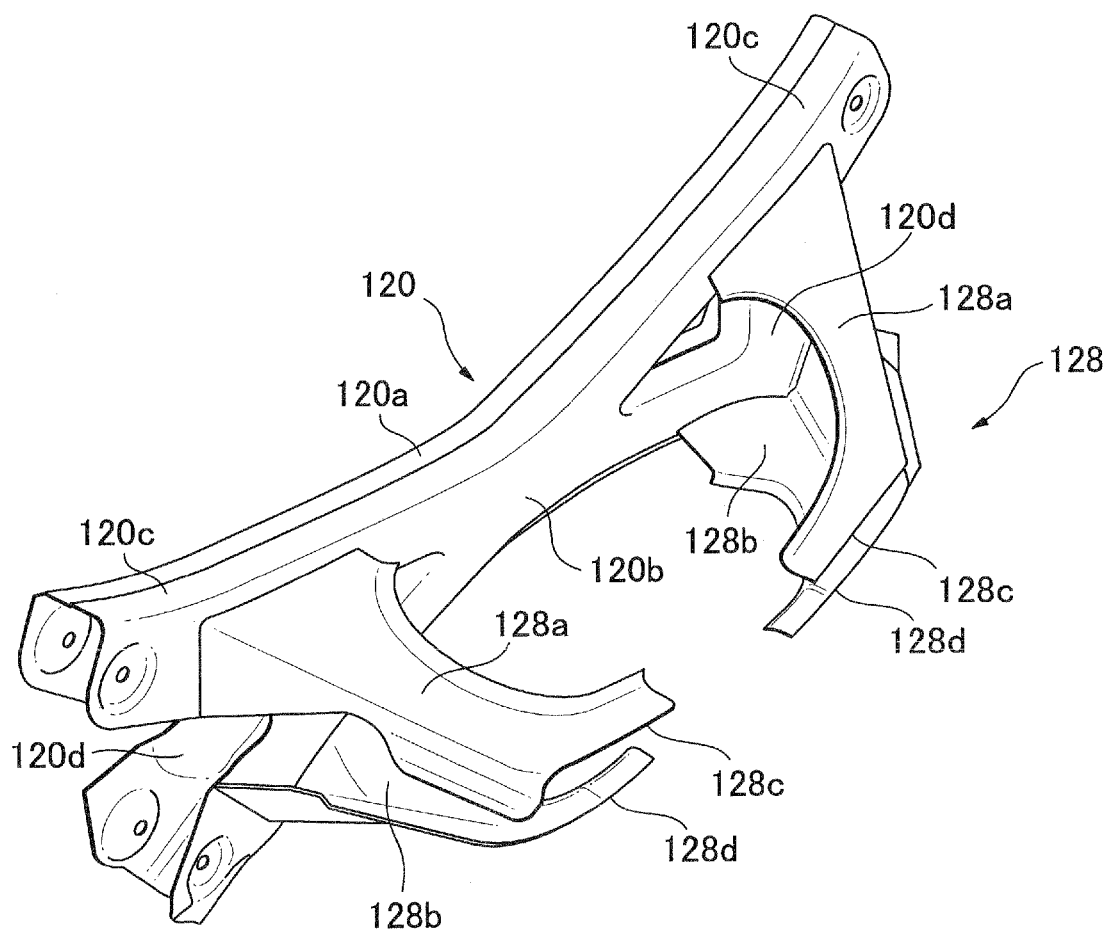
FIG. 15 is a perspective view showing an assembly of the front lateral member and right and left reinforcing inclined members in the suspension subframe structure according to the second embodiment, when viewed from a rear and left side thereof and obliquely from thereabove.
Figure 16:
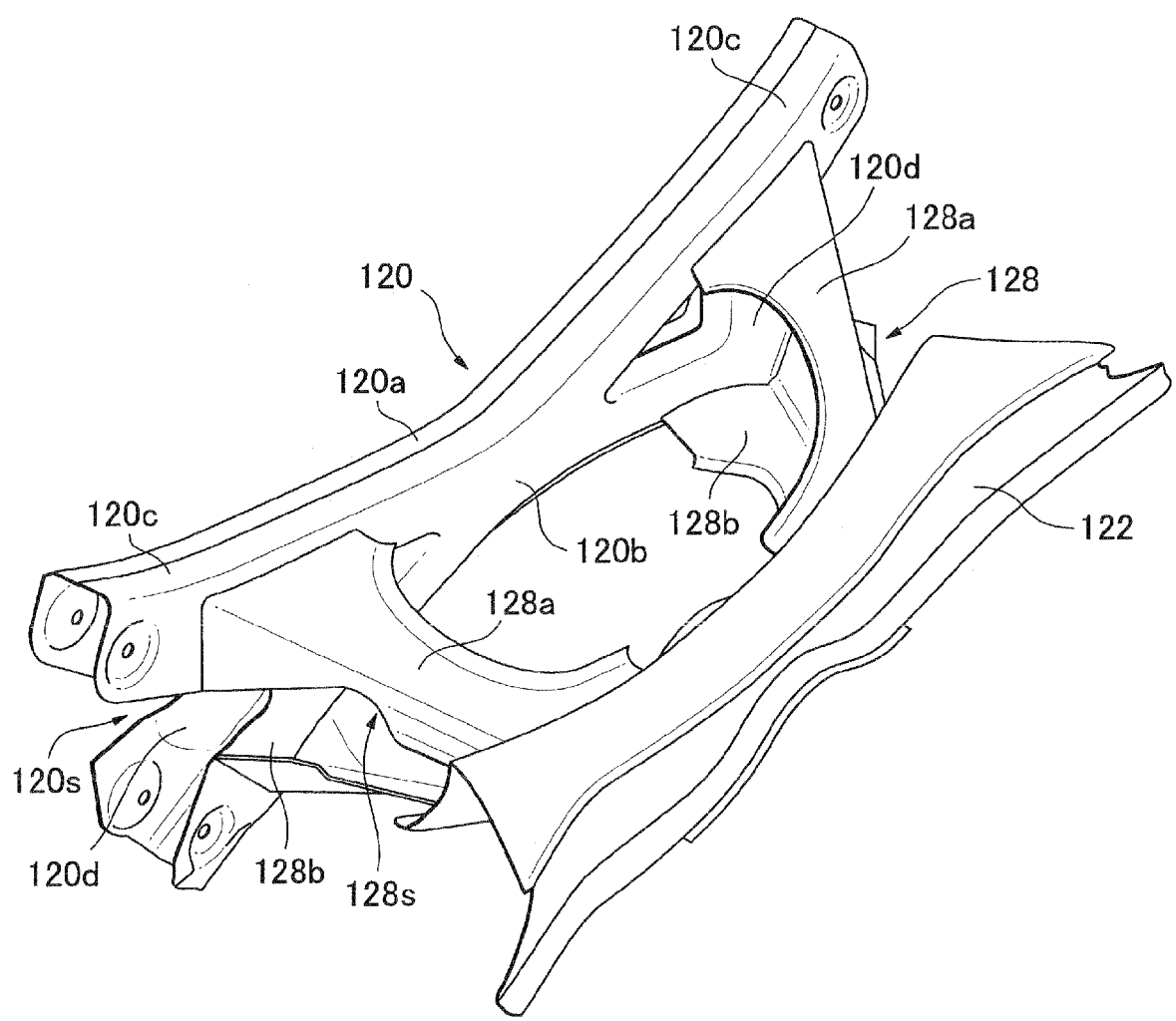
FIG. 16 is a perspective view showing an assembly of the front lateral member, the reinforcing inclined members and a rear lateral member in the suspension subframe structure according to the second embodiment, when viewed from a rear and left side thereof and obliquely from thereabove.

Mainly with reference to FIGS. 12 to 17, a structure of a rear suspension subframe 101 according to a second embodiment of the present invention will be described below. The suspension subframe 101 according to the second embodiment has the same basic structure as that of the suspension subframe 1 according to the first embodiment. Thus, the following description will be made primarily about a difference from the first embodiment. FIG. 12 is a top plan view showing a rear underbody structure of a vehicle employing the suspension subframe structure according to the second embodiment, and FIG. 13 is a bottom view showing the rear underbody structure employing the suspension subframe structure according to the second embodiment. FIG. 14 is a perspective view singly showing a front lateral member in the suspension subframe structure according to the second embodiment, when viewed from a rear and left side thereof and obliquely from thereabove, and FIG. 15 is a perspective view showing an assembly of the front lateral member and right and left reinforcing inclined members in the suspension subframe structure according to the second embodiment, when viewed from a rear and left side thereof and obliquely from thereabove. FIG. 16 is a perspective view showing an assembly of the front lateral member, the reinforcing inclined members and a rear lateral member in the suspension subframe structure according to the second embodiment, when viewed from a rear and left side thereof and obliquely from thereabove, and FIG. 17 is a perspective view showing an assembly of the front lateral member, the reinforcing inclined members, the rear lateral member and right and left longitudinal members in the suspension subframe structure according to the second embodiment, when viewed from a rear and left side thereof and obliquely from thereabove.

As shown in FIGS. 12 and 13, the rear suspension subframe 101 according to the second embodiment comprises a front lateral member 120 disposed on a frontward side of the rear suspension subframe 101 to extend in a lateral direction of a vehicle body (not shown), a rear lateral member 122 disposed on a rearward side of the rear suspension subframe 101 to extend in the lateral direction, a left longitudinal member 124 disposed on a left side of the rear suspension subframe 101 to extend in a frontward-rearward (i.e., longitudinal) direction of the vehicle body, a right longitudinal member 126 disposed on a right side of the rear suspension subframe 101 to extend in the longitudinal direction, and right and left reinforcing inclined members 28 each extending obliquely relative to the lateral direction in top plan view between the front lateral member 120 and the rear lateral member 122 to connect the front lateral member 120 and the rear lateral member 122, as with the structure illustrated in FIGS. 3 and 4 in the first embodiment.

As shown in FIG. 14, the front lateral member 120 comprises a front sub-member 120a having a cross-sectionally angular C shape with an opening facing rearwardly, and a rear sub-member 120b having a cross-sectionally angular C shape with an opening facing frontwardly. The front sub-member 120a and the rear sub-member 120b are joined together and formed as a single-piece member.

The front lateral member 120 has right and left ends each branched into an upper end 120c and a lower end 120d. Each of the upper and lower ends 120c, 120d is formed in a cross-sectionally angular C shape.

As shown in FIG. 15, each of the reinforcing inclined members 128 has a vertically split structure comprised of an upper sub-member 128a and a lower sub-member 128b. As shown in FIG. 15, in each of the reinforcing inclined members 128, the upper sub-member 128a has a front end joined to a rear surface of the rear sub-member 120b in the upper end 120c of the front lateral member 120 by welding, and the lower sub-member 128b has a front end joined to a rear surface of the rear sub-member 120b in the lower end 120d of the front lateral member 120. That is, the front end of each of the upper and lower sub-members 128a, 128b is joint to a vicinity of upper and lower suspension-arm mounting portions 150, 152 (see FIG. 17) in each of the right and left end of the front lateral member 120.

As shown in FIG. 16, the rear lateral member 122 is generally formed in a cross-sectionally angular C shape having an opening facing downwardly. In each of the reinforcing inclined members 128, each of the upper and lower sub-members 128a, 128b has a rear end (128c, 128d) joined to a front side surface of the rear lateral member 122 by welding.

As shown in FIG. 16, in each of the right and left ends of the front lateral member 120, an open portion 120s is formed between the upper end 102c and the lower end 12b. The open portion 120s is formed by joining the front and rear sub-members 120a, 120b of the front lateral member 120 together.

Further, in each of the reinforcing inclined members 128, an open portion 128s is formed between the upper sub-member 128a and the lower sub-member 128b. The open portion 128s is formed by joining the upper and lower sub-members 128a, 128b to the front lateral member 120 and the rear lateral member 122.

Then, each of the left and right longitudinal members 124, 126 is mounted to a corresponding one of a combination of the right open portions 120s, 128s and a combination of the left open portions 120s, 128s) by welding to form the rear suspension subframe 101 as shown in FIG. 7. In other words, in each of the reinforcing inclined members 128, the upper sub-member 128a and the lower sub-member 128b are connected together in the upward-downward direction through a corresponding one of the longitudinal members 124, 126. The upper sub-member 128a and the lower sub-member 128b connected together in the upward-downward direction through a corresponding one of the longitudinal members 124, 126 in this manner make it possible to improve rigidity of each of the reinforcing inclined members 128 and increase rigidity for supporting suspension arms so as to increase the overall rigidity of the rear suspension subframe 101.

Then, the pair of right and left rear suspension systems 2 as shown in FIG. 1 in the first embodiment are mounted to the rear suspension frame 101. As shown in FIG. 17, each of the left and right longitudinal members 124, 126 has a front end and a rear end provided with a front mount portion 144 and a rear mount portion 146, respectively. The rear suspension subframe 101 is mounted to the vehicle body through the front and rear mount portions 144, 146.

As shown in FIG. 17, the front and rear sub-members 120a, 120b of the front lateral member 120 are joined together to form the upper suspension-arm mounting portion 150 for the front upper arm 16 (see FIGS. 1 to 4) and the lower suspension-arm mounting portion 152 for the front lower arm 14

(see FIGS. 1 to 4) in respective ones of the upper end 120a and the lower end 120b of each of the right and left ends of the front lateral member 120

As shown in FIG. 17, each of the suspension-arm mounting portions 150 is formed with a hole 150a for mounting the rubber bush 16c (see FIG. 9) provided at the laterally inward end of the front upper arm 16, and each of the suspension-arm mounting portions 152 is formed with a hole 152a for mounting the rubber bush 14c (see FIG. 9) provided at the laterally inward end of the front lower arm 14.

The suspension subframe structure according to the second embodiment has the same functions and advantages as those in the first embodiment. Additionally, in the second embodiment, the front ends of the upper and lower sub-members 128a, 128b of each of the reinforcing inclined members 128 are weldingly joined to the rear surface of the rear sub-member 120b in the upper end 120c of the front lateral member 120 and the rear surface of the rear sub-member 120b in the lower end 120d of the front lateral member 120, respectively. The front lateral member 120 and the reinforcing inclined members 128 joined together in this manner make it possible to effectively increase the overall rigidity of the rear suspension subframe 101.

Further, instead of forming a part of respective ones of the suspension-arm mounting portions 150, 152 (50, 52) in the reinforcing inclined members 128 as in the first embodiment, in the second embodiment, the reinforcing inclined members 128 are joined to the front lateral member 120 in such a manner as to increase rigidity of the joined portion therebetween. This makes it possible to more effectively increase the overall rigidity of the rear suspension subframe 101.

Furthermore, the suspension-arm mounting portions 150, 152 are formed in respective ones of the upper and lower ends 120a, 12b of the front lateral member 120. This makes it possible to allow the front lateral member 120 extending in the lateral direction to effectively receive input loads from the suspension arms 14, 16.

As above, in the suspension subframe structure according to the second embodiment, a structure for increasing the overall rigidity of the rear suspension subframe 101 and a structure for effectively supporting the suspension arms can be designed independently to reliably enhance functions and effects of the respective structures.

Although the first and second embodiments have been described based on one example where the multi-link suspension system is an E-type multi-link suspension system, it is understood that the present invention may be applied to a subframe structure for any other suitable type of multi-link suspension system. Further, the rear lateral member 22 (122) may be formed in the same configuration as that of the front lateral member 20 (120) in the first or second embodiment. In this case, the reinforcing inclined members 28 may be arranged reversely in the longitudinal direction to receive loads from suspension arms mounted to the rear lateral member 22.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A suspension subframe structure of a vehicle for supporting a plurality of suspension arms of a pair of right and left multi-link suspension systems, comprising:

first and second lateral members provided in spaced-apart relation to each other in a longitudinal direction of a vehicle body and each extending in a lateral direction of the vehicle body;

a pair of longitudinal members each extending in the longitudinal direction, in such a manner that one of the longitudinal members connects respective left ends of the first and second lateral members, and the other longitudinal member connects respective right ends of the first and second lateral members;

a pair of right and left upper-arm support portions provided in respective ones of the right and left ends of the first lateral member;

a pair of right and left lower-arm support portions provided in respective ones of the right and left ends of the first lateral member; and right and left inclined members each extending obliquely relative to the lateral direction in top plan view to connect a respective one of the right and left ends or end-adjacent portions of the first lateral member with the laterally intermediate portion of the second lateral member, the right and left inclined members being adapted to transmit loads of the suspension systems from the upper-arm support portions and the lower-arm support portions, to the second lateral member therethrough.

2. The suspension subframe structure according to claim 1, wherein each of the right and left inclined members has one end joined to a respective one of the right and left ends of the first lateral member in such a manner as to form a corresponding one of a combination of the right upper-arm and lower-arm support portions and a combination of the left upper-arm and lower-arm support portions, in cooperation with the corresponding one of the right and left ends of the first lateral member.

3. The suspension subframe structure according to claim 1, wherein the first lateral member is comprised of at least two sub-members assembled together to form a combination of the right upper-arm and lower-arm support portions and a combination of the left upper-arm and lower-arm support portions, and each of the right and left inclined members is connected to a vicinity of a corresponding one of the combination of the right upper-arm and lower-arm support portions and the combination of the left upper-arm and lower-arm support portions.

4. The suspension subframe structure according to claim 1, wherein the first lateral member is adapted to receive loads diagonally between the left upper-arm support portion and the right lower-arm support portion and diagonally between the right upper-arm support portion and the left lower-arm support portion.

5. The suspension subframe structure according to claim 1, wherein each of the right and left inclined members has one end formed to connect the upper-arm and lower-arm support portions in a respective one of the right and left ends of the first lateral member, in an upward-downward direction.

6. The suspension subframe structure according to claim 5, wherein each of the right and left inclined members comprises an upper sub-member and a lower sub-member which are connected together in the upward-downward direction through a corresponding one of the longitudinal members.

7. The suspension subframe structure according to claim 1, wherein a part of respective ones of the upper-arm and lower-arm support portions is integrally formed in the right and left inclined members.

8. The suspension subframe structure according to claim 1, wherein the upper-arm and lower-arm support portions are integrally formed by the right and left ends of the first lateral member and ends of the right and left inclined members joined to respective ones of the right and left ends of the first lateral member.

9. The suspension subframe structure according to claim 8, wherein each of the upper-arm and lower-arm support portions integrally formed by the right and left ends of the first lateral member and the ends of the right and left inclined members joined to respective ones of the right and left ends has an angular C-shaped cross-section.

10. The suspension subframe structure according to claim 8, wherein each of the upper-arm and lower-arm support portions integrally formed by the right and left ends of the first lateral member and the ends of the right and left inclined members joined to respective ones of the right and left ends has a closed cross-section.

11. The suspension subframe structure according to claim 8, wherein the first lateral member and each of the right and left inclined members are joined together in a position between the upper-arm and lower-arm support portions in a respective one of the right and left ends of the first lateral member, wherein the joined portion between the first lateral member and each of the right and left inclined members is joined to a corresponding one of the longitudinal members.

12. The suspension subframe structure according to claim 1, wherein each of the right and left inclined members is formed to have a height dimension which gradually decreases in a direction from the upper-arm and lower-arm support portions toward the laterally intermediate portion of the second lateral member.

13. The suspension subframe structure according to claim 1, wherein each of the right and left inclined members is formed with at least one through-hole having a height dimension which gradually decreases in a direction from the upper-arm and lower-arm support portions corresponding to one end thereof, toward the laterally intermediate portion of the second lateral member.

14. The suspension subframe structure according to claim 1, wherein the first lateral member is formed by joining a front sub-member and a rear sub-member together, and the upper-arm and lower-arm support portions are integrally formed by the front sub-member and the rear sub-member.

15. The suspension subframe structure according to claim 1, wherein the upper-arm and lower-arm support portions in each of the right and left ends of the first lateral member are located above and below a corresponding one of the longitudinal members in such a manner as to interpose the longitudinal member therebetween while keeping a given small distance from the longitudinal member.

16. The suspension subframe structure according to claim 1, wherein the suspension arms of the right and left multi-link suspension systems comprise a pair of right and left front upper arms, a pair of right and left front lower arms, and a pair of right and left rear lower arms, wherein each of the front upper arms and the front lower arms is disposed on a frontward side of the right and left multi-link suspension systems, and each of the rear lower arms is disposed on a rearward side of the right and left multi-link suspension systems, and wherein the second lateral member is formed to allow each of the rear lower arms to be connected thereto in a same position as or in a vicinity of a position where the right and left inclined members are connected to the second lateral member.

17. The suspension subframe structure according to claim 1, wherein the suspension arms of the right and left multi-link suspension systems comprise a pair of right and left front upper arms and a pair of right and left front lower arms, each disposed on a frontward side of the right and left multi-link suspension systems, and the second lateral member is disposed rearward of the first lateral member, so that the first lateral member serves as a front lateral member, and the second lateral member serves as a rear lateral member, wherein;
  each of the right and left inclined members has one end joined to a respective one of the right and left ends of the front lateral member;
  the right and left upper-arm support portions are formed to support respective ones of the right and left front upper arms; and
  the right and left lower-arm support portions are formed to support respective ones of the right and left front lower arms.

18. The suspension subframe structure according to claim 1, wherein the suspension arms of the right and left multi-link suspension systems comprise a pair of right and left longitudinal arms each arranged to extend from a corresponding one of right and left road-wheel support members in a frontward direction of the vehicle body, and at least six lateral arms including a pair of right and left front upper arms and a pair of right and left front lower arms, each arranged to extend from a corresponding one of the right and left road-wheel support members in a laterally inward direction and disposed on a frontward side of the right and left multi-link suspension systems, wherein the right and left upper-arm support portions are formed to support respective ones of the right and left front upper arms, and the right and left lower-arm support portions are formed to support respective ones of the right and left front lower arms.

19. A suspension subframe structure of a vehicle for supporting a plurality of suspension arms of a pair of right and left multi-link suspension systems, comprising:
  first and second lateral members provided in spaced-apart relation to each other in a longitudinal direction of a vehicle body and each extending in a lateral direction of the vehicle body;
  a pair of longitudinal members extending in the longitudinal direction in such a manner that one of the longitudinal members connects respective left ends of the first and second lateral members, and the other longitudinal member connects respective right ends of the first and second lateral members; and
  right and left inclined members each having one end which is located on the side of a respective one of the right and left ends of the first lateral member and provided with an upper-arm support portion and a lower-arm support portion, each of the right and left inclined members extending obliquely relative to the lateral direction in top plan view to connect the upper-arm support portion and the lower-arm support portion with a laterally intermediate portion of the second lateral member.

20. A suspension subframe structure of a vehicle for supporting a plurality of suspension arms of a pair of right and left multi-link suspension systems, comprising:
  first and second lateral members provided in spaced-apart relation to each other in a longitudinal direction of a vehicle body and each extending in a lateral direction of the vehicle body;
  a pair of longitudinal members extending in the longitudinal direction in such a manner that one of the longitudinal members connects respective left ends of the first and second lateral members, and the other longitudinal member connects respective right ends of the first and second lateral members; and
  right and left inclined members each extending obliquely relative to the lateral direction in top plan view to connect a respective one of the right and left ends of the first lateral member with a laterally intermediate portion of the second lateral member, each of the right and left inclined members having one end which is joined to a respective one of the right and left ends of the first lateral member to form a suspension-arm support portion therebetween.

21. A suspension subframe structure of a vehicle for supporting a plurality of suspension arms of a pair of right and left multi-link suspension systems, comprising:

first and second lateral members provided in spaced-apart relation to each other in a longitudinal direction of a vehicle body and each extending in a lateral direction of the vehicle body;

a pair of longitudinal members each extending in the longitudinal direction, in such a manner that one of the longitudinal members connects respective left ends of the first and second lateral members, and the other longitudinal member connects respective right ends of the first and second lateral members;

a pair of right and left upper-arm support portions provided in respective ones of the right and left ends of the first lateral member;

a pair of right and left lower-arm support portions provided in respective ones of the right and left ends of the first lateral member; and right and left inclined members each extending obliquely relative to the lateral direction in top plan view to connect a respective one of the right and left ends or end-adjacent portions of the first lateral member with the laterally intermediate portion of the second lateral member, wherein each of the inclined members includes an upper sub-member and a lower sub-member, the upper sub-member is connected with the upper arm support portions or adjacent portions of the first lateral member, and the lower sub-member connects the lower-arm support portions or adjacent portions of the first lateral member with the second lateral member.

\* \* \* \* \*